United States Patent
Killian et al.

(10) Patent No.: US 11,789,972 B2
(45) Date of Patent: Oct. 17, 2023

(54) DATA SYNCHRONIZATION FOR CONTENT CONSUMED VIA A CLIENT APPLICATION

(71) Applicant: Snap Inc., Santa Monica, CA (US)

(72) Inventors: David Andrew Killian, Seattle, WA (US); Benjamin Ralph Hollis, Seattle, WA (US); Bradley Baron, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/205,877

(22) Filed: Mar. 18, 2021

(65) Prior Publication Data

US 2021/0303592 A1 Sep. 30, 2021

Related U.S. Application Data

(60) Provisional application No. 63/003,145, filed on Mar. 31, 2020.

(51) Int. Cl.
*G06F 16/27* (2019.01)
*G06F 16/21* (2019.01)

(52) U.S. Cl.
CPC ............ *G06F 16/27* (2019.01); *G06F 16/219* (2019.01); *G06F 16/273* (2019.01); *G06F 16/275* (2019.01); *G06F 16/278* (2019.01)

(58) Field of Classification Search
CPC ...... G06F 16/27; G06F 16/219; G06F 16/273; G06F 16/275; G06F 16/278
See application file for complete search history.

(56) References Cited

U.S. PATENT DOCUMENTS

| 10,324,903 | B1* | 6/2019 | Goldberg | G06F 3/065 |
|---|---|---|---|---|
| 2005/0060370 | A1* | 3/2005 | Xue | G06F 16/27 |
| | | | | 707/999.203 |
| 2010/0115126 | A1* | 5/2010 | Kanakadandi | G06F 16/219 |
| | | | | 709/237 |
| 2013/0218867 | A1* | 8/2013 | DeLuca | G06F 16/1873 |
| | | | | 707/E17.014 |
| 2013/0262420 | A1* | 10/2013 | Edelstein | G06F 40/197 |
| | | | | 707/695 |
| 2018/0255034 | A1* | 9/2018 | Brunn | H04L 9/0891 |

* cited by examiner

*Primary Examiner* — Alford W Kindred
*Assistant Examiner* — Lin Lin M Htay
(74) *Attorney, Agent, or Firm* — Schwegman Lundberg & Woessner, P.A.

(57) ABSTRACT

Systems and methods are provided for data synchronization for client application generated data. Content may be generated by a client application executed by a creator client device and sent to a server system that may distribute the content to one or more additional client devices of recipients of the content. The server system can push content to the recipient client devices without receiving a request for the content from the recipient client devices. The content generated by the creator client device may be stored by each of the creator client device, by the server system, and by the one or more recipient client devices. The server system may also generate version data related to respective versions of content that may be consumed by a client application. The version data may be used by client devices to determine versions of content that may be missing from the client devices.

20 Claims, 10 Drawing Sheets

DATA SYNCHRONIZATION FOR CONTENT CONSUMED VIA A CLIENT APPLICATION

CROSS-REFERENCE TO RELATED APPLICATION

This patent application claims the benefit of U.S. Provisional Patent Application No. 63/003,145, filed Mar. 31, 2020, entitled "DATA SYNCHRONIZATION FOR CONTENT CONSUMED VIA A CLIENT APPLICATION", which is incorporated by reference herein in its entirety.

BACKGROUND

Applications executed on client devices can be used to generate content. For example, client applications can be used to generate messaging content, image content, video content, audio content, media overlays, documents, creative artwork, combinations thereof, and the like. In various situations, this content can be exchanged between client devices via a computational system that enables the sharing of content between client devices.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
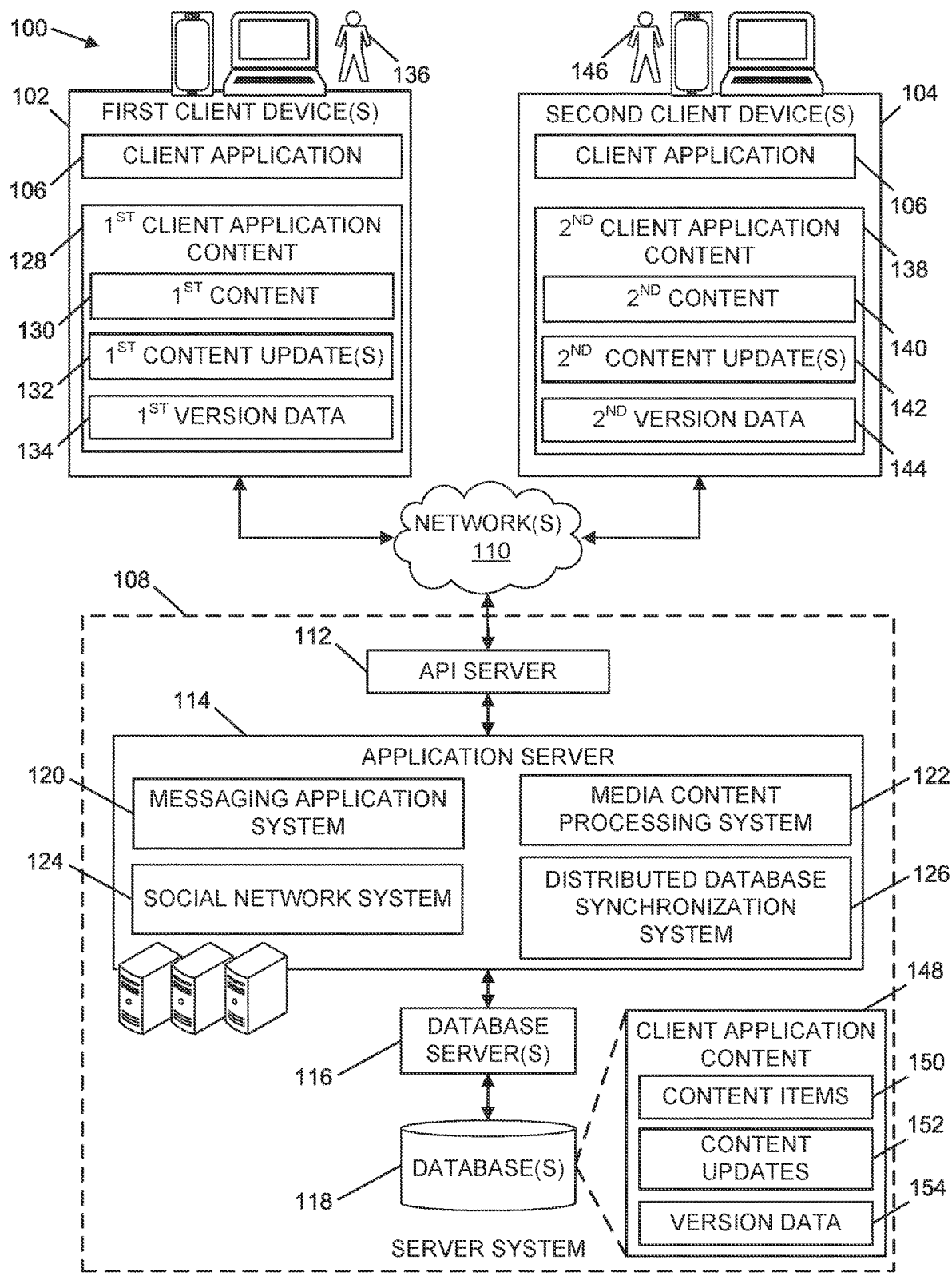
FIG. 1 is a diagrammatic representation of an architecture for exchanging data (e.g., messages and associated content) over a network, according to one or more example implementations.

Content may be created using applications that are executed by client devices. For example, a client application may be used to create messages that can be exchanged between client devices of users. In these situations, the client application can include at least one of a messaging application or a social networking application. The messages may include content, such as text content, video content, audio content, image content, or one or more combinations thereof. Client applications may also be used outside of a messaging context to generate at least one of text content, image content, video content, or audio content that can be shared between client devices.

In a messaging context and/or in a chat scenario, the synchronization of content may take place to facilitate the communication of messages in near real-time, such that the content shared by each participant in the messaging thread or in the chat session is viewable by the other participants. Additionally, in some social networking applications, individuals may post content that is viewable by others within a feed of content that is accessible to additional individuals via the social networking application. Social networking service providers may determine the content that is placed into the feed of individuals based on various criteria. Users can request that content from one or more content sources is provided to the respective feeds of the users and a social networking service provider can synchronize the content generated by one or more content sources with the feeds of the requesting users.

In various implementations, the version of content viewable by a user of a client device may not be updated with respect to the content generated by a content source. To illustrate, a client device operated by a participant in an exchange of messages during a communication session with one or more additional participants may not have received at least one of the messages in the communication session. In one or more examples, network disruptions and/or lack of connection between a client device and a network may cause the client device to miss one or more messages in a communication session. Additionally, a version of content produced by a content source may not include updates made by the content source. In situations where a version of content accessible by a client application does not correspond to an updated version of the content, a server system may update the content accessible by the client application executed by a client device. In conventional systems and techniques, a server system may synchronize the content that is accessible to the client device application with an updated version of the content. The content sent to the client device as part of the synchronization process typically includes additional content that goes beyond the amount of content needed to bring the content accessible to the client device up to date. Thus, conventional server systems do not take into account the minimum amount of content needed to update the client device and/or the version of the content that is already accessible to the client device when determining the amount of content to send to the client device as part of the synchronization process. Accordingly, conventional systems and techniques synchronize content generated by and exchanged by a client application in a manner that is inefficient in the amount of network resources and computational resources utilized as part of the synchronization process.

Additionally, in conventional systems and techniques, a substantial portion of the data generated through the use of a client application and the data accessed by the client application is not stored on the client device that is executing the client application. In contrast, much of the data generated through the use of the client application is stored by a server system that provides access to the data by one or more client devices of one or more users. Accordingly, with respect to conventional systems and techniques, the information accessed by a client application and used to generate one or more user interfaces to view the information is typically stored at a location that is remote from the client device executing the client application. As a result, the responsiveness of conventional client applications is typically delayed due to the client device fetching the data needed to execute operations of a client application from a remotely located server system. For example, when a client application is selected by a user, such as by selection of an icon corresponding to the client application, the client application typically requests data from a server system and the client application causes the client device to process the information received from the server system before causing the application to be opened and the information to be displayed. In further implementations, one or more user interfaces of the client application may be displayed and users may experience delays before most up-to-date content is displayed.

The systems, methods, techniques, instruction sequences, and computing machine program products described herein are directed to data synchronization for client application generated data. Content may be generated by a first client application executed by a creator client device and sent to a server system that may distribute the content to one or more additional client devices of recipients of the content. In this way, the server system can push content to the one or more recipient client devices without receiving a request for the content from the one or more recipient client devices. Accordingly, the content received by the one or more recipient client devices can be accessible to instances of the client application being executed by the one or more recipient client devices once the application is selected by a user, rather than the process followed by conventional systems where the one or more recipient client devices wait to retrieve the content until the client application is selected by a user. The content generated by the creator client device is stored by each of the creator client device, by the server system, and by the one or more recipient client devices. For example, each of the creator client device, the server system, and the one or more recipient client devices may maintain a data structure that stores the same or similar information and that is accessible by the client application. The content stored in the data structures of the creator client device, the server system, and the one or more recipient client devices may include an initial version of the content and updated versions of the content.

The server system may also generate version data related to updates to content that may be consumed by a client application. The version data may indicate a sequential order of the updates to the content. In one or more implementations, the server system can send the version data to the recipient client devices in conjunction with the content updates. By sending the version data in addition to any subsequent updates to the recipient client devices, gaps in the versions of the content obtained by the recipient client devices may be identified. In this way, a recipient client device that is missing one or more versions of content may send a content synchronization request to the server system and the server system may update the versions of the content that are not stored by the recipient client device. The content synchronization request may be sent by the recipient client device as a background process while the client application is not receiving input from the user and/or the client application is not causing information to be displayed via one or more user interfaces. Accordingly, the content and content updates can be useable and accessible to a client application executing on the recipient client device without having to fetch the content and/or updates from the server system. Thus, the speed in which the content may be used by the client application and/or displayed by the client device can be increased with respect to conventional systems where a delay is typically present between the time that a client application is opened and the time new content is accessible to and/or useable by a client application. In various implementations, the server system may identify a minimum amount of content needed to update a client device in response to a content synchronization request received from the client device. As a result, the amount of network resources utilized to update a client device can be minimized in relation to conventional systems that typically send more information than needed to update a client device executing a client application.

In one or more illustrative examples, a client application may include messaging functionality. An instance of the client application executed by a sender client device may generate a message and send the message in response to user input to a recipient client device via a server system. The server system may store the message in a datastore and generate version data indicating a version of the message. The server system may then send the message and the version data to the recipient client device. The recipient client device may also store the message in a data structure that is accessible to an instance of the client application executed by the recipient client device. Version data corresponding to the message may also be stored by the recipient client device. In various examples, the client application may be in use by an individual operating the recipient client device. In these situations, the message may be shown on a display device of the recipient client device in response to the recipient client device receiving the message. In additional examples, the client application may be closed and not receiving input from a user and/or not displaying information via the client device. In these scenarios, the client application may update a communication session between a sender and the recipient to include the latest version of the message such that when the client application is opened, the updated communication session is ready for viewing by the recipient without the client device specifically requesting the updated information from the server system.

FIG. 1 is a diagrammatic representation of an architecture 100 for exchanging data (e.g., messages and associated content) over a network. The architecture 100 may include multiple client devices, including a first client device 102 and a second client device 104. The client devices 102, 104 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102, 104 may host a number of applications, including a client application 106. A user may use the client application 106 to create content, such as video, images (e.g., photographs), audio, and media overlays. In one or more illustrative examples, the client application 106 may include a social networking application. In various examples, the client application 106 may include messaging functionality that may be used to send messages between client devices, such as the first client device 102 and the second client device 104. The messages created using the client application 106 may include video, one or more images, audio, media overlays, text, content produced using one or more creative tools, and the like. In one or more implementations, the client application 106 may be used to view and generate interactive messages, view locations of other users of the client application 106 on a map, chat with other users of the client application 106, and so forth.

One or more users may be a person, a machine, or other means of interacting with a client device, such as the first client device 102 or the second client device 104. In example implementations, the user may not be part of the architecture 100 but may interact with one or more components of the architecture 100 via a client device 102, 104 or other means. In various examples, users may provide input (e.g., touch screen input or alphanumeric input) to a client device 102, 104, and the input may be communicated to other entities in the architecture 100. In this instance, the other entities in the architecture 100, responsive to the user input, may communicate information to a client device 102, 104 to be presented to the users. In this way, users may interact with the various entities in the architecture 100 using the client device 102, 104.

Each instance of the client application 106 is able to communicate and exchange data with at least one of another instance of the client application 106, one or more third-party applications, or a server system 108. The data exchanged between client applications 106, and/or the server system 108 includes functions (e.g., commands to invoke functions) and payload data (e.g., text, audio, image, video, or other multimedia data). Data exchanged between the client applications 106, between the third-party applications, and between at least one client application 106 and at least one third-party application may be exchanged directly from an instance of an application executed by a client device and an instance of an application executed by an additional client device. Further, data exchanged between the client applications 106, between the third-party applications, and between at least one client application 106 and at least one third-party application may be communicated indirectly (e.g., via one or more intermediate servers) from an instance of an application executed by a client device and an instance of an application executed by an additional client device. In one or more illustrative examples, the one or more intermediate servers used in indirect communications between applications may be included in the server system 108.

The server system 108 provides server-side functionality via one or more networks 110 to the client application 106. The server system 108 may be a cloud computing environment, according to some example implementations. For example, the server system 108, and one or more servers associated with the server system 108, may be associated with a cloud-based application, in one illustrative example. In one or more implementations, the first client device 102, the second client device 104, and the server system 108 may be coupled via the one or more networks 110. One or more portions of the one or more networks 110 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of a public switched telephone network (PSTN), a cellular telephone network, a wireless network, a WI-FI network, a WiMax network, another type of network, or a combination of two or more such networks.

The server system 108 supports various services and operations that are provided to the client application 106. Such operations include transmitting data to, receiving data from, and processing data generated by the client application 106. This data may include message content, client device information, geolocation information, media annotation and overlays, message content persistence conditions, social network information, and live event information, as examples. Data exchanges within the architecture 100 are invoked and controlled through functions available via user interfaces (UIs) of the client application 106.

While certain functions of the architecture 100 are described herein as being performed by either a client application 106 or by the server system 108, the location of functionality either within the client application 106 or the server system 108 is a design choice. For example, it may be technically preferable to initially deploy certain technology and functionality within the server system 108, but to later migrate this technology and functionality to the client application 106 where a client device 102, 104 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102, 104 and viewing on client devices 102, 104), context data related to a media content item, context data related to a user device (e.g., a computing or client device 102, 104), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, 104, client applications 106, users, third-party applications, and so forth.

The API server 112 receives and transmits data (e.g., commands and message payloads) between the client devices 102, 104 and the application server 114. Specifically, the Application Program Interface (API) server 112 provides a set of interfaces (e.g., routines and protocols) that can be called or queried by the client application 106 in order to invoke functionality of the application server 114. The Application Program Interface (API) server 112 exposes various functions supported by the application server 114, including account registration, login functionality, the sending of messages, via the application server 114, from one instance of the client application 106 to another instance of the client application 106, the sending of media files (e.g., images, audio, and/or video) from a client application 106 to the application server 114, and for possible access by another client application 106, the setting of a collection of media content (e.g., a gallery, story, message collection, or media collection), the retrieval of a list of friends of a user of a client device 102, 104, the retrieval of such collections, the retrieval of messages and content, the adding and deletion of friends to a social graph, the location of friends within a social graph, and opening an application event (e.g., relating to the client application 106).

The application server 114 hosts a number of applications and subsystems, including a messaging application system 120, a media content processing system 122, a social network system 124, and a distributed database synchronization system 126. The messaging application system 120 implements a number of message processing technologies and functions, particularly related to the aggregation and other processing of content (e.g., textual and multimedia content) included in messages received from multiple instances of the client application 106. For example, the messaging application system 120 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 120 may aggregate text and media content from multiple sources into collections of content. These collections are then made available, by the messaging application system 120, to the client application 106. Other processor- and memory-intensive processing of data may also be performed server-side by the messaging application system 120, in view of the hardware requirements for such processing.

The media content processing system 122 is dedicated to performing various media content processing operations, typically with respect to images, audio, or video received within the payload of a message at the messaging application system 120. The media content processing system 122 may access one or more data storages (e.g., the database(s) 118) to retrieve stored data to use in processing media content and to store results of processed media content.

The social network system 124 supports various social networking functions services, and makes these functions and services available to the messaging application system 120. To this end, the social network system 124 maintains and accesses an entity graph within the database(s) 118. Examples of functions and services supported by the social network system 124 include the identification of other users of the client application 106 with which a particular user has relationships or is "following", and also the identification of other entities and interests of a particular user. The social network system 124 may access location information associated with each of the user's friends to determine where they live or are currently located geographically. In addition, the social network system 124 may maintain a location profile for each of the user's friends indicating the geographical location where the user's friends live.

The distributed database synchronization system 126 may synchronize content created using the client application 106 and stored by the first client device 102, the second client device 104, and the one or more databases 118. For example, an instance of the client application 106 executed by at least one of the first client device 102 and/or the second client device 104 may determine that a version of content stored by the first client device 102 and/or the second client device 104 is not a current version of the content. In these situations, the client application 106 may send a content synchronization request to the server system 108 and the distributed database synchronization system 126 may send an updated version of the content to at least one of the first client device 102 or the second client device 104.

In one or more implementations, the first client device 102 may store first client application content 128. The first client application content 128 may include first content 130, first content updates 132, and first version data 134. The first content 130 may include content generated by an instance of the client application 106 executed by the first client device 102 and/or content generated by additional instances of the client application 106 executed by one or more additional client devices, such as the second client device 104. For example, at least a portion of the first content 130 may be generated based on input received by the client application 106 via one or more input devices of the first client device 102. At least a portion of the first content 130 may include at least one of messages or media content for which a first user 136 is a recipient, such as one or more messages and/or media content generated by an instance of the client application 106 executed by the second client device 104 and sent to the first client device 102.

In various examples, the first user 136 may activate one or more input devices of the first client device 102 to cause the client application 106 to produce one or more messages that may comprise at least a portion of the first content 130. In one or more illustrative examples, the first content 130 may include a message or a collection of messages that may be ephemeral and be removed from a computing device, such as a computing device of a recipient of the message, after the message has been viewed or after a predetermined amount of time (e.g., 10 seconds, 24 hours, etc.). An ephemeral message refers to a message that is accessible for a time-limited duration. An ephemeral message may include text, one or more images, one or more videos, or other such content that may be stitched or joined together in accordance with implementations described herein. The access time for the ephemeral message may be set by a sender of the message. In additional examples, the access time may be a default setting or a setting specified by the recipient. Regardless of the setting technique, an ephemeral message is transitory in that the ephemeral message is temporarily stored on one or more computing devices, such as the client devices 102, 104 and the server system 108.

In one or more additional examples, the first user 136 may activate one or more input devices of the first client device 102 to cause the client application 106 to produce media content that may comprise at least a portion of the first content 130. In various examples, the media content may include at least one of images, video, text, audio, media overlays, and the like. In one or more illustrative examples, the client application 106 may enable the first user 136 to take a photograph or video, add a caption or otherwise edit the photograph or video, and then send the photograph or video to a client device of another user. In further examples, the client application 106 may enable the first user 136 to create media overlays that include content that overlays one or more forms of media, such as one or more images or one or more videos. The client application 106 may also enable the first user 136 to produce a gallery that may include a collection of at least one of photos, videos, or text that may be viewed by other users that have elected to follow (e.g., subscribed to view and receive updates) in regard to the gallery of the first user 136.

The first content updates 132 may include updated versions of original content that is stored by the first client device 102. For example, the first content updates 132 may include updated versions of at least a portion of the first content 130. In one or more illustrative examples, an initial message of a communication session may be stored as part of the first content 130 and additional messages included in the communication session may be stored as first content updates 132. In one or more additional illustrative examples, an initial version of media content may be stored as part of the first content 130 with additional versions of the media content being stored as the first content updates 132.

The first version data 134 may include information indicating respective versions of the first content 130. The first version data 134 may indicate modifications that have been made to initial versions of content. In one or more illustrative examples, the first version data 134 may be generated according to a scheme indicating a sequential order in which the versions of content have been produced. For example, the first version data 134 may indicate a sequential order of different versions of content beginning from an initial version of the content to a most recent version of the content. To illustrate, for a given content item, the first version data 134 may monotonically increase for each modified version of the initial content item. In these scenarios, the first version data 134 may indicate a "1" for an initial version of a content item, a "2" for a first modified version of the content item, and a "3" for a second modified version of the content item. In additional examples, the first version data 134 may include time-based information indicating a time that one or more modifications were made to an original version of content.

The second client device 104 may store second client application content 138 that may be different from the first client application content 128. The second client application content 138 may include second content 140, second content updates 142, and second version data 144. The second content 140 may include content generated by an instance of the client application 106 executed by the second client device 104 and/or content generated by additional instances of the client application 106 executed by one or more additional client devices, such as the first client device 102. For example, at least a portion of the second content 140 may be generated based on input received by the client application 106 and from a second user 146 via one or more input devices of the second client device 104. The second content updates 142 may include updated versions of original content that is stored by the second client device 104 and the second version data 144 may include information indicating respective versions of the second content 140.

The database(s) 118 may store client application content 148 generated by a number of client devices, such as the first client device 102 and the second client device 104. The client application content 148 may include content items 150. The content items 150 may correspond to content generated through the use of the client application 106 on a number of client devices. For example, the content items 150 can include the first content 130 and the second content 140. The content items 150 may include individual messages, collections of messages, image content, video content, text content, audio content, media overlays, collections of media content, one or more combinations thereof, and the like. Additionally, the client application content 148 may include content updates 152 that include updated versions of the initial versions of content items 150. In various examples, the content updates 152 may include at least the first content updates 132 and the second content updates 142. Further, the client application content 148 may include version data 154 that corresponds to the respective versions of the content items 150 and the content updates 152. In one or more illustrative examples, the version data 154 may include at least the first version data 134 and the second version data 144.

In one or more implementations, the server system 108 may perform operations such that the content generated by instances of the client application 106 executed on a number of client devices is synchronized with the client application content 148 stored by the database(s) 118. For example, content generated by the instance of the client application 106 executed by the first client device 102 may be stored by both the first client device 102 and by the database(s) 118. Additionally, content for which the first user 136 is a recipient may also be stored by both the first client device 102 and the database(s) 118. The first user 136 may be a recipient for content that is shared with the first user 136, content generated by one or more additional users of the client application 106 that are being followed by the first user 136, and/or content that is sent directly to the first user 136. In situations where at least a portion of the first client application content 128 and/or at least a portion of the first content update(s) 132 do not correspond to at least one of a portion of the content items 150 or at least a portion of the content updates 152, the distributed database synchronization system 126 may identify the information that is missing from the first client application content 128 and send the missing information to the first client device 102.

In one or more illustrative examples, the first user 136 may exchange messages in a communication session with one or more additional users. The first client device 102 may receive a message and corresponding version data from the server system 108 as part of the communication session. The client application 106 may determine, based on the version data, that one or more messages of the communication session are not included in the first client application content 128. For example, the client application 106 may analyze the version data for the message received from the server system 108 in relation to the first version data 134 and determine that there is a discrepancy between the version data for the message received from server system 108 and the first version data 134. The client application 106 may then send a content synchronization request to the server system 108 indicating the discrepancy between the version data for the message received from the server system 108 and the first version data 134 and the content synchronization request may include a request to provide the missing information to the first client device 102. In response to the content synchronization request and based on the discrepancy in the version data, the distributed database synchronization system 126 may determine one or more messages that have not been received and stored by the first client device 102 with respect to the communication session. The distributed database synchronization system 126 may cause the server system 108 to send the one or more missing messages to the first client device 102. In this way, the record of the communication session stored by the first client device 102 corresponds to the record of the communication session stored by the database(s) 118. Additionally, a minimum amount of information is sent by the server system 108 to the first client device 102 to bring the record of the communication session stored by the first client device 102 up-to-date because the distributed database synchronization system 126 sends the one or more missing messages to the first client device 102 without sending additional information to the first client device 102 as is typically performed in conventional systems.

Figure 2:
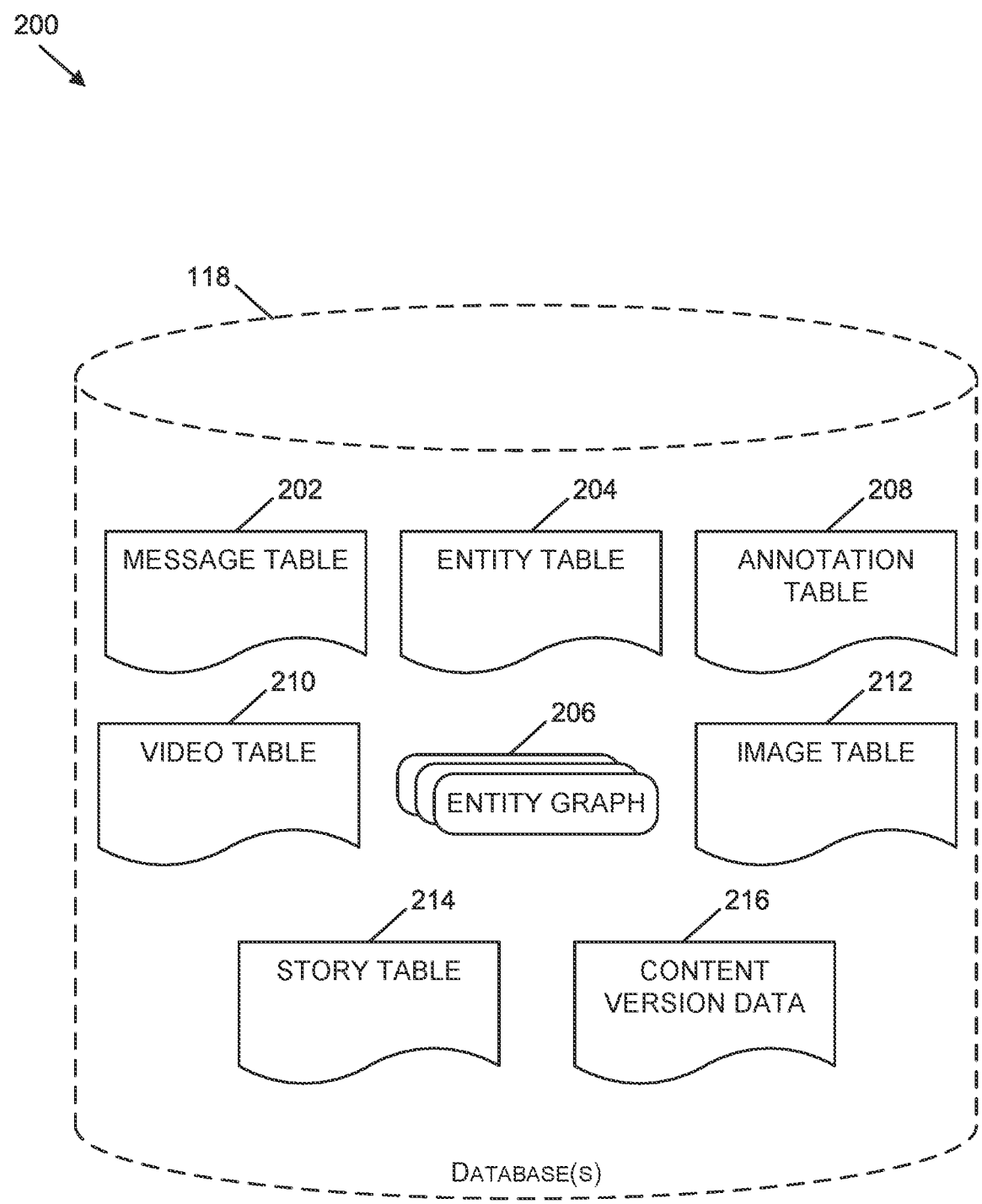
FIG. 2 is a schematic diagram illustrating data that may be stored in a database of a server system, according to one or more example implementations.

FIG. 2 is a schematic diagram illustrating data structures 200 which may be stored in the database(s) 118 of the server system 108, according to certain example implementations. While the content of the database(s) 118 is shown to comprise a number of tables, it will be appreciated that the data could be stored in other types of data structures (e.g., as an object-oriented database).

The database(s) 118 may include message data stored within a message table 202. The entity table 204 may store entity data, including an entity graph 206. Entities for which records are maintained within the entity table 204 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 206 furthermore stores information regarding relationships and associations between entities. Such relationships may be social, professional (e.g., work at a common corporation or organization) interested-based or activity-based, merely for example.

The database(s) 118 may also store annotation data, in the example form of filters, in an annotation table 208. Filters for which data is stored within the annotation table 208 are associated with and applied to videos (for which data is stored in a video table 210) and/or images (for which data is stored in an image table 212). Filters, in one example, are overlays that are displayed as overlaid on an image or video during presentation to a recipient user. Filters may be of various types, including user-selected filters from a gallery of filters presented to a sending user by the client application 106 when the sending user is composing a message. Other types of filters include geolocation filters (also known as geo-filters) which may be presented to a sending user based on geographic location. For example, geolocation filters specific to a neighborhood or special location may be presented within a user interface by the client application 106, based on geolocation information determined by a GPS unit of a client device, such as the first client device 102 or the second client device 104. Another type of filter is a data filter, which may be selectively presented to a sending user by the client application 106, based on other inputs or information gathered by a client device 102, 104 during the message creation process. Example of data filters include current temperature at a specific location, a current speed at which a sending user is traveling, battery life for a client device 102, 104, or the current time.

Other annotation data that may be stored within an image table 212 may include so-called "lens" data. A "lens" may be a real-time special effect and sound that may be added to an image or a video.

As mentioned above, the video table 210 stores video data which, in one or more implementations, is associated with messages for which records are maintained within the message table 202. Similarly, the image table 212 stores image data associated with messages for which message data is stored in the entity table 204. The entity table 204 may associate various annotations from the annotation table 208 with various images and videos stored in the image table 212 and the video table 210.

A story table 214 stores data regarding collections of messages and associated image, video, or audio data, which are compiled into a collection (e.g., a story or a gallery). The creation of a particular collection may be initiated by a particular user (e.g., each user for which a record is maintained in the entity table 204). A user may create a "personal story" in the form of a collection of content that has been created and sent/broadcast by that user. To this end, one or more user interfaces generated by the client application 106 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 106, to contribute content to a particular live story. The live story may be identified to the user by the client application 106, based on his or her location. The end result is a "live story" told from a community perspective.

A further type of content collection is known as a "location story", which enables a user whose client device, such as the first user 136 of the first client device 102, is located within a specific geographic location (e.g., on a college or university campus) to contribute to a particular collection. In some implementations, a contribution to a location story may require a second degree of authentication to verify that the end user belongs to a specific organization or other entity (e.g., is a student on the university campus).

The database(s) 118 may also store content version data 216 that indicates a version of content with respect to an initial version of the content. The content version data 216 may indicate a sequence of messages included in a communication session between a number of users of the client application 106. The content version data 216 may also indicate modifications to various content of a particular type. For example, the content version data 216 may indicate different versions of image content. To illustrate, the content version data 216 may indicate an initial version of image content, a first subsequent version of the image content that includes a first version of an overlay, and a second subsequent version of the image content that includes a second version of the overlay. In one or more illustrative examples, the initial version of the image content may include an image, the first subsequent version of the image content may include text overlaying the image, and the second subsequent version of the image content may include a creative work and the text overlaying the image. The creative work may include content generated using one or more tools of the client application 106, such as a graphics tool, a design tool, a drawing tool, a painting tool, an image content editing tool, a video content editing tool, an audio content editing tool, or one or more combinations thereof. In one or more additional illustrative examples, the content may include different versions of a creative work produced by a user of the client application 106. In these scenarios, the content version data 216 may indicate an initial version of the creative work produced using one or more tools of the client application 106 and a subsequent version of the creative work that includes modifications made to the initial version of the creative work.

The content version data 216 may correspond to a scheme that is implemented by the server system 108 to generate the content version data 216. In one or more implementations, the scheme may include assigning version identifiers to respective versions of content where the version identifiers are numeric (e.g., whole numbers) and increase monotonically for each version of the content. In one or more additional implementations, the scheme may include assigning a time stamp to respective versions of the content. Respective versions of content may be identified using one or more processes. For example, a different version identifier may be assigned to content in response to input from a user of the client application 106. To illustrate, during a communication session that includes a number of users of the client application 106, a different version identifier may be assigned to the communication session or to each message within the communication session each time that a user participating in the communication session provides input to send a new message to the other users participating in the communication session. In one or more additional illustrative examples, a different version identifier may be assigned to content that has been edited using one or more creative tools of the client application 106 based on input from a user of the client application 106, such as input to save a modified version of the content. In one or more further illustrative examples, a different version identifier may be assigned to content that has been edited or is being edited using one or more creative tools of the client application 106 periodically, such as after a period of time has elapsed.

Figure 3:
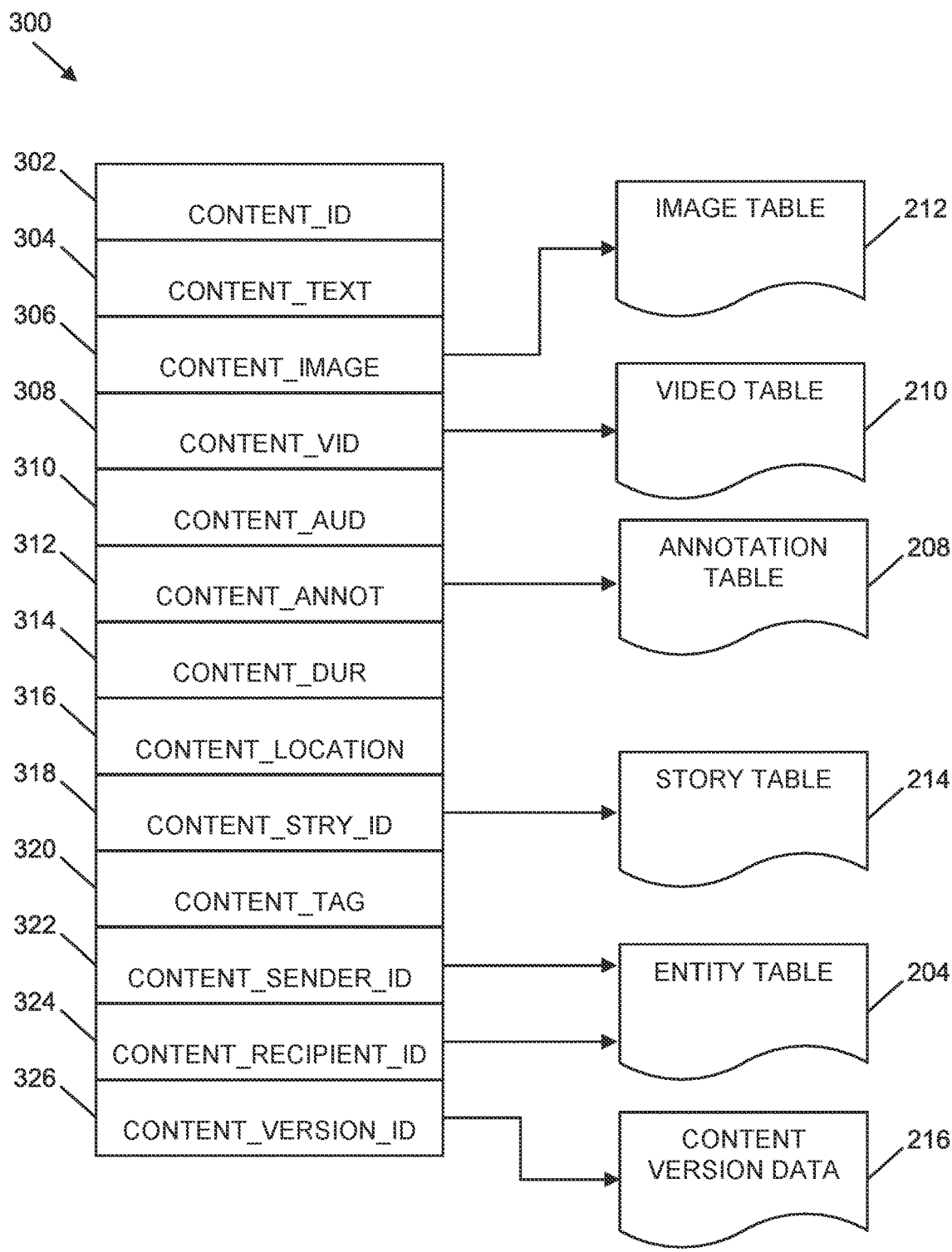
FIG. 3 is a schematic diagram illustrating an example framework for content that may be generated by a client application, in accordance with one or more example implementations.

FIG. 3 is a schematic diagram illustrating an example framework for content 300, according to some in some implementations. The content 300 may be generated by a first instance of a client application 106 and communicated to at least one of a second instance of the client application 106 or the server system 108. In situations where the content 300 includes a message, the content 300 may be used to populate the message table 202 stored within the database(s) 118 and accessible by the application server 114. In one or more implementations, the content 300 may be stored in memory as "in-transit" or "in-flight" data of at least one of the client devices 102, 104 or the application server 114. The content 300 is shown to include the following components:

- A content identifier 302: a unique identifier that identifies the content 300.
- A content text payload 304: text, to be generated by a user via a user interface of the client application 106 and that may be included in the content 300.
- A content image payload 306: image data, captured by a camera component of a client device 102, 104 or retrieved from a memory component of a client device 102, 104, and that is included in the content 300.
- A content video payload 308: video data, captured by a camera component or retrieved from a memory component of a client device 102, 104 and that is included in the content 300.
- A content audio payload 310: audio data, captured by a microphone or retrieved from a memory component of a client device 102, 104, and that is included in the content 300.
- Content annotations 312: annotation data (e.g., filters, stickers or other enhancements) that represents annotations to be applied to content image payload 306, content video payload 308, or content audio payload 310 of the content 300.
- A content duration parameter 314: parameter value indicating, in seconds, the amount of time for which the content 300 (e.g., the content image payload 306, content video payload 308, content audio payload 310) is to be presented or made accessible to a user via the client application 106.
- A content geolocation parameter 316: geolocation data (e.g., latitudinal and longitudinal coordinates) associated with the payload of the content 300. Multiple values of the geolocation parameter 316 may be included in the payload with each of the values of the geolocation parameter 316 being associated with respect to content items included in the content 300 (e.g., a specific image within the content image payload 306, or a specific video in the content video payload 308).
- A content story identifier 318: identifier values identifying one or more content collections (e.g., "stories") with which a particular content item in the content image payload 306 of the content 300 is associated. For example, multiple images within the content image payload 306 may each be associated with multiple content collections using identifier values.
- A content tag 320: content 300 may be tagged with multiple tags, each of which is indicative of the subject matter of one or more content items included in the payload of the content 300. For example, where a particular image included in the content image payload 306 depicts an animal (e.g., a lion), a tag value may be included within the content tag 320 that is indicative of the relevant animal. Tag values may be generated manually, based on user input, or may be automatically generated using, for example, image recognition.
- A content sender identifier 322: an identifier (e.g., a system identifier, email address, or device identifier) indicative of a user of a client device, such as the first user 136 of the first client device 102 or the second user 146 of the second client device 104, on which the content 300 was generated and from which the content 300 was generated and/or sent.
- A content recipient identifier 324: an identifier (e.g., a system identifier, email address, or device identifier) indicative of a user of a client device, such as the first user 136 of the first client device 102 or the second user 146 of the second client device 104, to which the content 300 is addressed or otherwise accessible.
- A content version identifier 326: an identifier of a version of a content item included in the content 300. In one or more implementations, the content 300 may include a number of version identifiers based on the payload of the content 300. In various examples, a respective version identifier may be assigned to at least one of the content text payload 304, the content image payload 306, the content video payload 308, the content audio payload 310, or one or more annotations 312. For example, in scenarios where the content 300 includes content text payload 304 and content image payload 306, in at least some cases, a first version identifier may be assigned to the content text payload 304 and a second version identifier may be assigned to the content image payload 306. In these scenarios, as a content item is modified, the version identifier corresponding to the content item may also be modified. To illustrate, a version identifier of the content text payload 304 may be modified based on changes to the content text payload 304 while a version identifier of the content image payload 306 may remain unchanged in situations where the content image payload 306 is not modified in conjunction with the content text payload 304. In one or more additional examples, a single version identifier may be assigned to content 300. In these scenarios, a change to at least one of the content text payload 304, the content image payload 306, the content video payload 308, the content audio payload 310, or the one or more annotations 312 may cause the content version identifier 326 to be modified.

The data (e.g., values) of the various components of content 300 may correspond to pointers to locations in tables within which the data is stored. For example, an image value in the content image payload 306 may be a pointer to (or address of) a location within an image table 212. Similarly, values within the content video payload 308 may point to data stored within a video table 210, values stored within the annotations 312 may point to data stored in an annotation table 208, values stored within the content story identifier 318 may point to data stored in a story table 214, and values stored within the content sender identifier 322 and the content recipient identifier 324 may point to user records stored within an entity table 204. Further, values of the content version identifier may point to data stored within a data structure that includes content version data 216.

Figure 4:
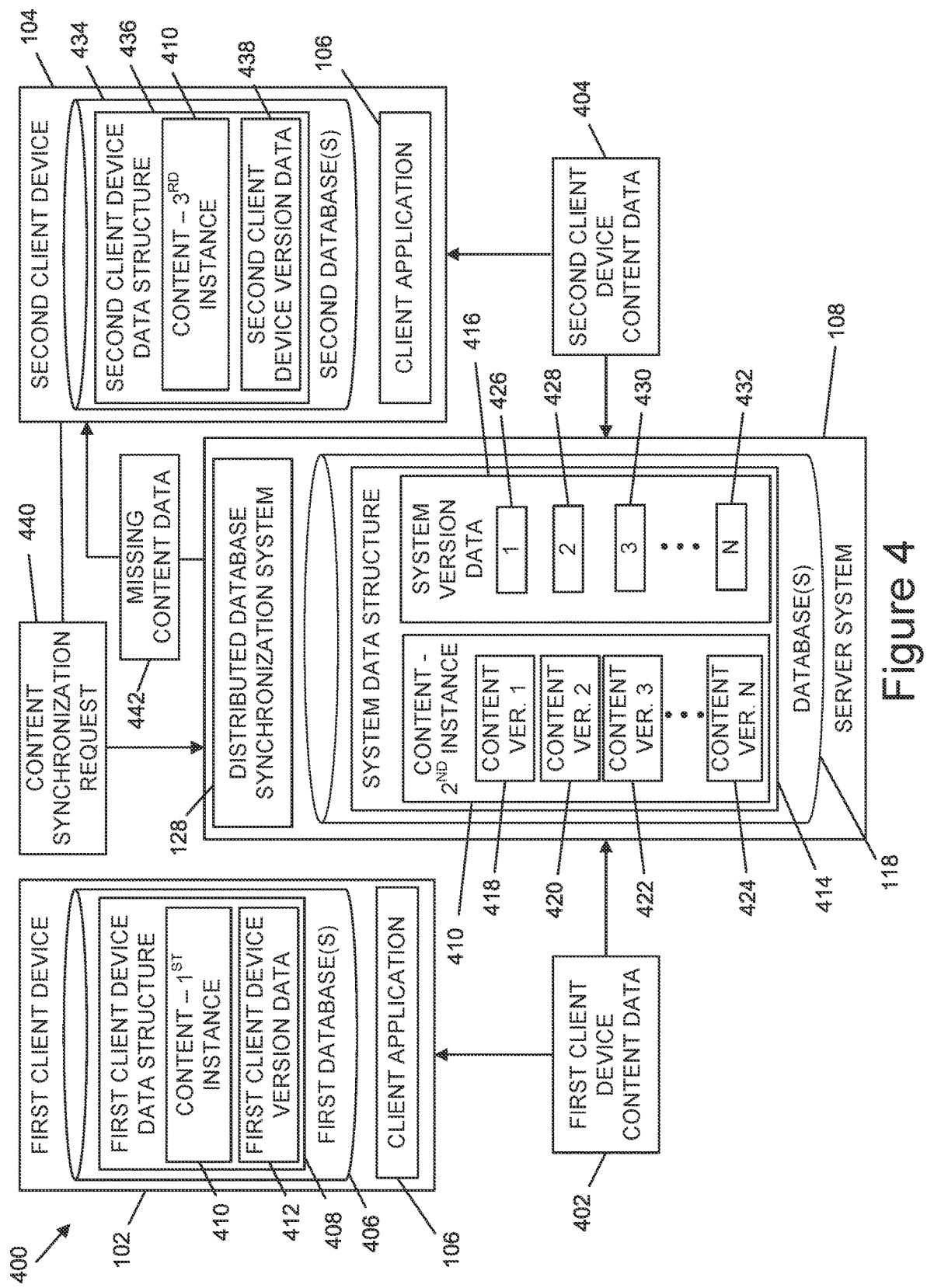
FIG. 4 is a diagrammatic representation illustrating a system to perform the synchronization of data between at least a first client device, a second client device, and a server system, according to one or more example implementations.

FIG. 4 is a diagrammatic representation illustrating a system 400 to perform the synchronization of data between at least a first client device 102, a second client device 104, and a server system 108, according to one or more example implementations. The first client device 102 may execute an instance of the client application 106 to produce content and/or to consume content generated by other instances of the client application 106 executed by additional client devices, such as an instance of the client application 106 executed by the second client device 104. The consumption of content by the client application 106 may include the processing and output of the content such that the content may be viewed and/or heard by a user of the client application 106. In one or more implementations, the server system 108 may direct the exchange of content between instances of the client application 106 executed by a number of client devices. For example, the server system 108 may receive content generated by the client application 106 from a number of client devices, identify recipients of the content, and send the content to client devices of the recipients.

First client device content data 402 may be exchanged between the server system 108 and the first client device 102. The first client device content data 402 may include content generated using the instance of the client application 106 executed by the first client device 102 and sent to the server system 108 to be directed to one or more recipients. The first client device content data 402 may also include content that is sent to the first client device 102 by the server system 108. Additionally, second client device content data 404 may be exchanged between the server system 108 and the second client device 104. The second client device content data 404 may include content generated using the instance of the client application 106 executed by the second client device 104 and sent to the server system 108 to be directed to one or more recipients. In addition, the second client device content data 404 may include content that is sent to the second client device 104 by the server system 108.

In the illustrative example of FIG. 4, the first client device 102 may include a first database 406. The first database 406 may include one or more non-transitory computer-readable storage media that store data generated by the instance of the client application 106 executed by the first client device 102. The first database 406 may also store information obtained from the server system 108 that is related to the client application 106. For example, the first database 406 may store content obtained directly from the server system 108, such as content generated by a service provider that develops and administers the client application 106. Additionally, the first database 406 may store content that is produced by other users of the client application 106 and for which the first user 136 of the first client device 102 is a recipient.

In one or more implementations, the client application 106 may generate one or more data structures to store content that is included in the first client device content data 402 and the second client device content data 404. For example, an instance of the client application 106 executed by the first client device 102 may generate a first client device data structure 408 that is stored by the first database 406. The first client device data structure 408 may store content items that are related to one another. To illustrate, the client application 106 may generate the first client device data structure 408 to be dedicated to storing content, such as messages, images, video, annotations, or one or more combinations thereof, included in a communication session between a number of users of the client application 106, including the first user 136 of the first client device 102. Additionally, the first client device data structure 408 may be dedicated to storing content that the first user 136 is subscribed to or following from one or more content producers. In one or more illustrative examples, the first client device data structure 408 may store content generated by a respective content producer that the first user 136 of the first client device 102 is subscribed to or following. In one or more additional illustrative examples, the first client device data structure 408 may be dedicated to storing content generated by a group of content producers that the first user 136 of the first client device 102 is subscribed to or following. Further, the first client device data structure 408 may store one or more versions of a creative work produced by one or more users of the client application 106.

Additionally, the first client device data structure 408 may store first client device version data 412. The first client device version data 412 may include version data for the first instance of the content 410. For example, the first client device version data 412 may include one or more version identifiers that correspond to one or more respective content items included in the first instance of the content 410.

In various examples, the first client device data structure 408 may include one or more first data elements to store content produced by the client application 106. The first client device data structure 408 may also include one or more second data elements to store version data related to the content stored by the one or more first data elements. In one or more illustrative examples, the first client device data structure 408 may include a table with a number of first rows and a number of first columns that store content. Further, the first client device data structure 408 may include one or more second columns and one or more second rows that store version data corresponding to the content stored by the first client device data structure 408. In the implementations where the first client device data structure 408 includes a table, the first instance of the content 410 may be stored in a number of first rows corresponding to the number of first columns and the first client device version data 412 may be stored in the one or more second columns of the database table. In various examples, one or more rows may be used to store the version data.

The database(s) 118 of the server system 108 may store a system data structure 414 that corresponds to the first client device data structure 408. The system data structure 414 may store a second instance of content 410 that corresponds to the first instance of content 410. In one or more illustrative examples, the first instance of the content 410 may be produced using the instance of the client application 106 executed by the first client device 102 and then communicated to the server system 108. The server system 108 may then store the content 410 in the system data structure 414 as the second instance of the content 410. The system data structure 414 may also include system version data 416 that corresponds to the second instance of the content 410. The system version data 416 may include one or more version identifiers that correspond to one or more respective versions of the second instance of the content 410.

In the illustrative example of FIG. 4, the second instance of the content 410 may include a first content version 418, a second content version 420, a third content version 422, up to an Nth content version 424. In addition, the system version data 416 may include a first version identifier 426, a second version identifier 428, a third version identifier 430, up to an Nth version identifier 432. The first version identifier 426 may correspond to the first content version 418, the second version identifier 428 may correspond to the second content version 420, the third version identifier 430 may correspond to the third content version 422, and the Nth version identifier 432 may correspond to the Nth content version 424. The version identifiers 426, 428, 430, 432 may be assigned to the respective content versions 418, 420, 422, 424 according to a scheme. In the illustrative example of FIG. 4, the version identifiers 426, 428, 430, 432 are monotonically increasing numerals starting from "1" corresponding to an initial, first content version 418 and additional numerals, such as "2" and "3" corresponding to subsequent content versions 420, 422. In additional implementations, the version identifiers 426, 428, 430, 432 may be produced according to one or more additional schemes. For example, the version identifiers 426, 428, 430, 432 may correspond to a time in which the respective content versions 418, 420, 422, 424 were at least one of produced, sent, received, or saved/persisted using the client application 106.

In scenarios where the content 410 corresponds to messages exchanged in a communication session between users of the client application, each of the content versions 418, 420, 422, 424 may include an individual message of the communication session. Additionally, in situations where the content 410 corresponds to image content, video content, audio content, a creative work, and/or text content, each of the content versions 418, 420, 422, 424 may include an original version of the content 410 and subsequent modifications to the content 410. For example, modifications to the content 410 can include adding annotations, making changes to a creative work, modifying text content, modifying image content, modifying video content, modifying audio content, one or more combinations thereof, and so forth.

In one or more implementations, the server system 108 may determine version data to assign to content produced using the client application 106 after receiving the content from a client device. For example, after receiving the first content version 418 from the first client device 102, the server system 108 may determine whether the first content version 418 is an initial version of the content 410 or whether the first content version 418 included modifications to an initial version of the content 410. The server system 108 may determine whether the first content version 418 is an initial version of the content 410 or a modified version of the content 410 based on information obtained from the instance of the client application 106 executed by the first client device 102. To illustrate, the instance of the client application 106 executed by the first client device 102 may send version data to the server system 108 indicating whether the first content version 418 is an initial version of the content 410 or a modified version of the content 416. In addition, the server system 108 may analyze the first content version 418 to determine whether the first content version 418 corresponds to additional content stored by the database(s) 118. In various examples, the server system 108 may determine a measure of similarity between the first content version 418 and additional content stored by the database(s) and use the measure of similarity to determine that the first content version 418 is an initial version of the content 410 or a modified version of the content 410. Further, the instance of the client application 106 executed by the first client device 102 may send timing information to the server system 108 in conjunction with the first content version 418. In these situations, the server system 108 may use the timing information to determine a version identifier for the first content version 418. In the illustrative example of FIG. 4, the server system 108 may determine that the first content version 418 is an initial version of the content 410. The server system 108 may then determine a version identifier for the first content version 418 according to a scheme implemented by the server system 108 to generate version identifiers.

In various examples, the server system 108 may generate version data for content and send the version data to a client device that sent the content to the server system 108. The version data may then be stored by the client device in conjunction with the content. For example, before determining a version identifier for the first content version 418, the server system 108 may analyze the first content version 418 with respect to one or more criteria after receiving the first content version 418 from the first client device 102. To illustrate, the server system 108 may analyze the first content version 418 in relation to one or more security criteria, one or more content restriction criteria, one or more computational resource criteria, one or more combinations thereof, and the like. In situations where the first content version 418 satisfies the one or more criteria, the server system 108 may store the first content version 418 in the system data structure 414 and generate the first version identifier 426 for the first content version 418. In one or more implementations, the server system may then send the first version identifier 426 to the first client device 102 or the server system 108 may cause the instance of the client application 106 executed by the first client device 102 to generate or update the version identifier for the first content version 418 stored by first client device data structure 408. In this way, before version data is generated for content item and/or before the content is stored by the system data structure 414, the server system 108 may perform one or more operations to ensure that the content satisfies at least minimum requirements for content that is generated by the client application 106 and that is accessible via the client application 106.

The second client device 104 may include a second database 434 that may include one or more non-transitory computer-readable storage media that store data generated by the instance of the client application 106 executed by the second client device 104. The second database 434 may also store information obtained from the server system 108 that is related to the client application 106. For example, the second database 434 may store content obtained directly from the server system 108, such as content generated by a service provider that develops and administers the client application 106. Additionally, the second database 434 may store content that is produced by other users of the client application 106 and for which the second user 146 of the second client device 104 is a recipient.

In one or more implementations, the instance of the client application 106 executed by the second client device 104 may generate one or more data structures, such as the second client device data structure 436, to store content that is included in the second client device content data 404. The second client device data structure 436 may store content items that are related to one another. To illustrate, the client application 106 may generate the second client device data structure 436 to be dedicated to storing content, such as messages, images, video, annotations, or one or more combinations thereof, included in a communication session between a number of users of the client application 106, including the second user 146 of the second client device 104. Additionally, the second client device data structure 436 may be dedicated to storing content that the second user 146 is subscribed to or following from one or more content producers. In the illustrative example of FIG. 4, the second client device data structure 436 may be dedicated to storing a third instance of the content 410 and second client device version data 438 that corresponds to the third instance of the content 410.

In one or more illustrative examples, the first user 136 of the first client device 102 may use the client application 106 to produce the first content version 418. Additionally, the second user 146 of the second client device 104 may be a recipient of the first content version 418. In these situations, the instance of the client application 106 executed by the first client device 102 may send the first content version 418 to the server system 108. The server system 108 may determine that the second user 146 of the second client device 104 is a recipient of the first content version 418. The server system 108 may also analyze the first content version 418 with respect to one or more criteria and determine that the first content version 418 satisfies the one or more criteria. Further, the server system 108 may store the first content version 418 as part of the second instance of the content 410 and determine version data for the first content version 418, such as the first version identifier 426. In various examples, the server system 108 may then send the first content version 418 and the first version identifier 426 to the second client device 104. The second client device 104 may store the first content version 418 as part of the third instance of the content 410 and the first version identifier 426 as part of the second client device version data 438.

In various examples, the first client device data structure 408, the system data structure 414, and the second client device data structure 436 may have permissions restrictions with respect to writing data to at least one of the first client device version data 412, the system version data 416, or the second client device version data 438. For example, the permissions restrictions may limit the computing devices that may cause changes to the first client device version data 412, the system version data 416, and/or the second client device version data 438. In one or more illustrative examples, the permissions restrictions may enable the instance of the client application 106 used to create and/or modify content to make changes to the version data corresponding to the content. To illustrate, the instance of the client application 106 executed by the first client device 102 may have permission to generate version data for content generated by and/or modified by the instance of the client application 106 executed by the first client device 102. In one or more illustrative examples, the instance of the client application 106 executed by the first client device 102 may be used to generate the first content version 418 and the permission restrictions for the version data stored by the first client device data structure 408 may enable the client application 106 to generate the first version identifier 426. The client application 106 may then store the first version identifier 426 as part of the first client device version data 412 and send the first version identifier 426 to the server system 108 for storage as part of the system version data 416. Version identifiers for subsequent updates made to the content 410 using the instance of the client application 106 executed by the first client device 102 may also be generated by the first client device 102 and stored as part of the first client device version data 412 and/or the system version data 416.

In additional implementations, the permissions restrictions may enable the server system 108 to make changes to the version data corresponding to content produced by instances of the client application 106 executed by client devices. In one or more illustrative examples, the instance of the client application 106 executed by the first client device 102 may be used to produce the first content version 418. In these scenarios, the server system 108 may obtain the first content version 418 from the first client device 102 and generate the first version identifier 426. The server system 108 may then store the first version identifier 426 as part of the system version data 416. Further, the server system 108 may send the first version identifier 426 to the first client device 102 for storage as part of the first client device version data 412. In various examples, the server system 108 may also send one or more commands to the first client device 102 to cause the client application 106 to generate the first version identifier 426 to be stored as part of the first client device version data 412.

In one or more implementations, the data stored by the first client device data structure 408 may correspond to the data stored by the system data structure 414 and the second client device data structure 436. In situations where the data stored by at least one of the first client device data structure 408, the system data structure 414, or the second client device data structure 436 does not correspond to at least one other of the first client device data structure 408, the system data structure 414, or the second client device data structure 436, the distributed database synchronization system 126 may perform operations to synchronize the data stored by each of the first client device data structure 408, the system data structure 414, or the second client device data structure 436. In this way, the instances of the content 410 stored by the first client device 102, the second client device 104, and the server system 108 may be the same or substantially the same.

In various examples, the first user 136 and the second user 146 may be recipients and/or senders of the content 410. In one or more illustrative examples, the second client device data structure 436 may store the first content version 418 having the first version identifier 426 and the second content version 420 having the second version identifier 428. The second client device 104 may obtain the Nth content version 424 having the Nth version identifier 432 from the server system 108. The instance of the client application 106 executed by the second client device 104 may determine that the second client device data structure 436 is missing one or more versions of the content 410 between the second content version 420 and the Nth content version 424.

After determining that at least one version of the content 410 is absent from the second client device version data 438, the instance of the client application 106 executed by the second client device 104 may send a content synchronization request 440 to the server system 108. The content synchronization request 440 may indicate at least a portion of the content 410 is absent from the second client device data structure 436. For example, the content synchronization request 440 may indicate one or more version identifiers that are absent from the second client device version data 438

In response to the content synchronization request 440 from the second client device 104, the distributed database synchronization system 126 may determine one or more versions of the content 410 that are absent from the second client device data structure 436. In one or more implementations, the distributed database synchronization system 126 may use the version data included in the content synchronization request 440 to determine the versions of the content 410 that are absent from the second client device data structure 436. For example, the distributed database synchronization system 126 may receive information indicating that the second client device version data 438 includes the second version identifier 428 and the Nth version identifier 432. In these situations, the distributed database synchronization system 126 may determine one or more version identifiers between the second version identifier 428 and the Nth version identifier 432. The distributed database synchronization system 126 may then identify the versions of the content 410 that correspond to the one or more identifiers. To illustrate, the distributed database synchronization system 126 may determine that the third version identifier 430 is between the second version identifier 428 and the Nth version identifier 432 and determine that the third content version 422 corresponds to the third version identifier 430.

Based on the one or more versions of the content 410 that are absent from the second client device data structure 436, the distributed database synchronization system 126 may send missing content data 442 to the second client device 104. The missing content data 442 may include one or more previous versions of the content 410 that were not stored by the second client device data structure 436. Additionally, the missing content data 442 may include version data corresponding to the version of the content 410 that are absent from the second client device data structure 436. For example, in one or more scenarios where the distributed database synchronization system 126 determines that the third content version 422 is absent from the third instance of the content 410 stored by the second client device data structure 436, the missing content data 442 may include at least the third content version 422. Further, in these situations, the missing content data 442 may also include one or more version identifiers that include at least the third version identifier 430.

After receiving the missing content data 442 from the server system 108, the instance of the client application 106 executed by the second client device 104 may update the third instance of the content 410 stored by the second client device data structure 436. In various example, the client application 106 may also update the second client device version data 438 based on the missing content data 442. For example, the client application 106 may add at least the third content version 422 to the third instance of the content 410. In one or more examples, the client application 106 may also add the third version identifier 430 to the second client device version data 438. In this way, the distributed database synchronization system 126 may perform operations to synchronize the instances of the content 410 stored by the first client device 102, the second client device 104, and the server system 108, such that the same or substantially the same data is stored by the first client device data structure 408, the system data structure 414, and the second client device data structure 436. Additionally, the distributed database synchronization system 126 may perform operations to synchronize the respective data structures 408, 414, 436 using a minimum amount of information. To illustrate, by using the second client device version data 438 and a scheme by which the version identifiers for the content 410 is generated, the client application 106 and/or the distributed database synchronization system 126 may determine the versions of the content 410 that are absent from the second client device data structure 436. As a result, the distributed database synchronization system 126 may determine and send the missing versions of the content 410 to the second client device 104 without sending extraneous information as part of the synchronization process, such as one or more additional versions of the content 410 and/or one or more additional version identifiers that are not absent from the second client device data structure 436.

Figure 5:
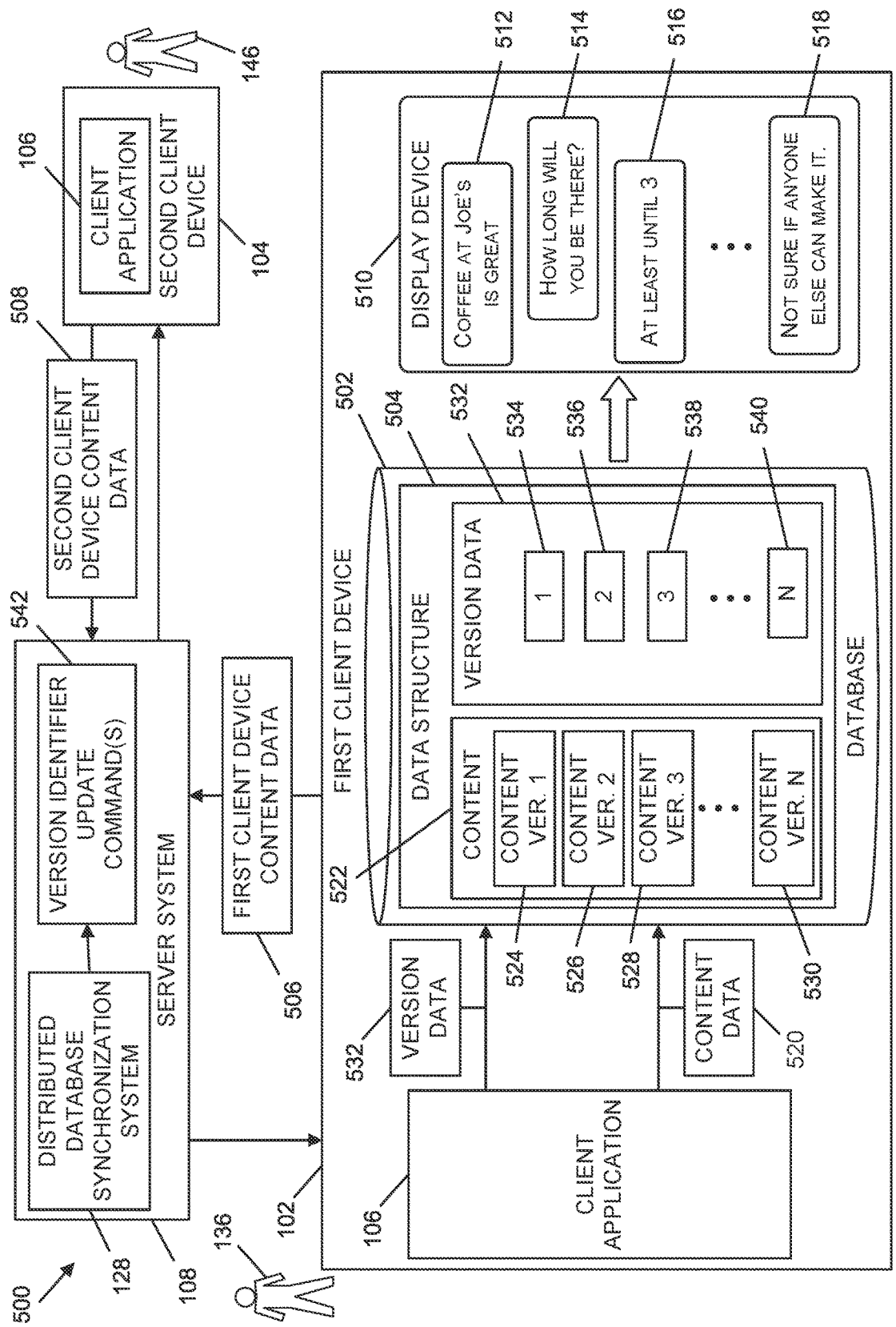
FIG. 5 is a diagrammatic representation of an environment illustrating the exchange and synchronization of content between client devices by a server system, in accordance with some example implementations.

FIG. 5 is a diagrammatic representation of an environment 500 illustrating the exchange and synchronization of content between client devices 102, 104 by the server system 108, in accordance with some example implementations. The first client device 102 may include a first instance of the client application 106 and the second client device 104 may include a second instance of the client application 106. The first client device 102 may include a database 502 that stores a data structure 504. The data structure 504 may be generated by the instance of the client application 106 executed by the first client device 102 to store content that is produced in association with a communication session between the first user 136 of the first client device 102 and the second user 146 of the second client device 104. For example, messages can be exchanged between the first client device 102 and the second client device 104 using messaging functionality of the client application 106. The messages and metadata related to the messages sent from the first client device 102 may be included in the first client device content data 506 and messages and metadata related to the message sent from the second client device 104 may be included in the second client device content data 508.

The first client device content data 506 may include one or more messages generated by the first user 136 using the client application 106. In various examples, the first client device content data 506 may also include data indicating one or more recipients of each of the one or more messages, such as the second user 146 of the second client device 104. The second client device content data 508 may include one or more messages generated by the second user 146 using the client application 106. The second client device content data 508 may also include data indicating one or more recipients of the one or more messages included in the second client device content data 508, such as the first user 136.

The messages exchanged between the first client device 102 and the second client device 104 may be displayed on display device of the first client device 102 and the second client device 104. For example, messages exchanged in a communication session between the first client device 102 and the second client device 104 may be displayed in a user interface 510 of the first client device 102. To illustrate, the user interface 510 may include a first message 512, a second message 514, a third message 516, up to an Nth message 518. In one or more illustrative examples, the first user 136 may provide a number of inputs to the client application 106 to generate the first message 512, the third message 516, and the Nth message 518. In addition, the instance of the client application 106 executed by the first client device 102 may receive data corresponding to the second message 514 from the server system 108. In various examples, the second message 514 may be produced by the second user 146 providing a number of inputs to an instance of the client application 106 executed by the second client device 104.

The instance of the client application 106 executed by the first client device 102 may store content data 520 related to the messages 512, 514, 516, 518 in the data structure 504.

For example, the data structure 504 may be dedicated to storing content 522 corresponding to the messages 512, 514, 516, 518 of the communication session between the first user 136 and the second user 146. In one or more examples, the content 522 may include a first content version 524 that corresponds to the first message 512, a second content version 526 that corresponds to the second message 514, a third content version 528 that corresponds to the third message 516, and an Nth content version 530 that corresponds to the Nth message 518. The data structure 504 may also store version data 532 obtained from the client application 106 that corresponds to the content 522. The version data 532 may include a number of version identifiers that correspond to the respective versions of the content 522. To illustrate, the version data 532 may include a first version identifier 534 that corresponds to the first content version 524 and the first message 512, a second version identifier 536 that corresponds to the second content version 526 and the second message 514, a third version identifier 538 that corresponds to the third content version 528 and the third message 516, up to an Nth version identifier 540 that corresponds to the Nth content version 530 and the Nth message 518. In one or more illustrative examples, the version data 532 may be generated according to a scheme.

In one or more implementations, permissions may be associated with the version data. The permissions may indicate that changes to version identifiers may be made by the server system 108. In these situations, the distributed database synchronization system 126 may generate version update commands 542 that are sent to the instances of the client application 106 executed by the first client device 102 and the second client device 104. For example, the server system 108 may receive data corresponding to the first message 512 from the instance of the client application 106 executed by the first client device 102 and determine that the first message 512 is an initial version of content generated in a communication session between the first user 136 of the first client device 102 and the second user 146 of the second client device 104. The server system 108 may then send the first content version 524 to the second client device 104. The distributed database synchronization system 126 may also send the version update commands 542 to the respective instances of the client application 106 executed by the first client device 102 and the second client device 104 to generate the first version identifier 534 to be stored by the data structure 504 and to be stored by an additional data structure of the second client device 104 that is also dedicated to storing content of the communication session between the first user 136 and the second user 146. As messages are added to the communication session by at least one of the first user 136 or the second user 146, the distributed database synchronization system 126 may send additional version update commands 542 to the instances of the client application 106 executed by the first client device 102 and the second client device 104 to update the version identifiers of the content included in the communication session.

The distributed database synchronization system 126 may operate to cause respective databases accessible to the first client device 102, the second client device 104, and the server system 108 to store synchronized content in relation to the communication session that includes the messages 512, 514, 516, 518. The distributed database synchronization system 126 may provide one or more messages that are absent from the databases of the first client device 102 and/or the second client device 104 with respect to the communication session between the first user 136 and the second user 146. For example, after receiving version data 532 from the distributed database synchronization system 126, the instance of the client application 106 executed by the first client device 102 may determine a gap between version identifiers of the content 522. To illustrate, the client application 106 may determine that there is a gap between the third version identifier 538 and the Nth version identifier 540 that does not correspond to the scheme by which the version data 532 is produced. In this way, the client application 106 may determine that at least one message from the communication session between the first user 136 and the second user 146 is absent from the data structure 504. As a result, the client application 106 may send a content synchronization request to the distributed database synchronization system 126. The distributed database synchronization system 126 may then send the one or more missing messages to the instance of the client application 106 executed by the first client device 102. The one or more missing messages may be displayed by the user interface 510.

Figure 6:
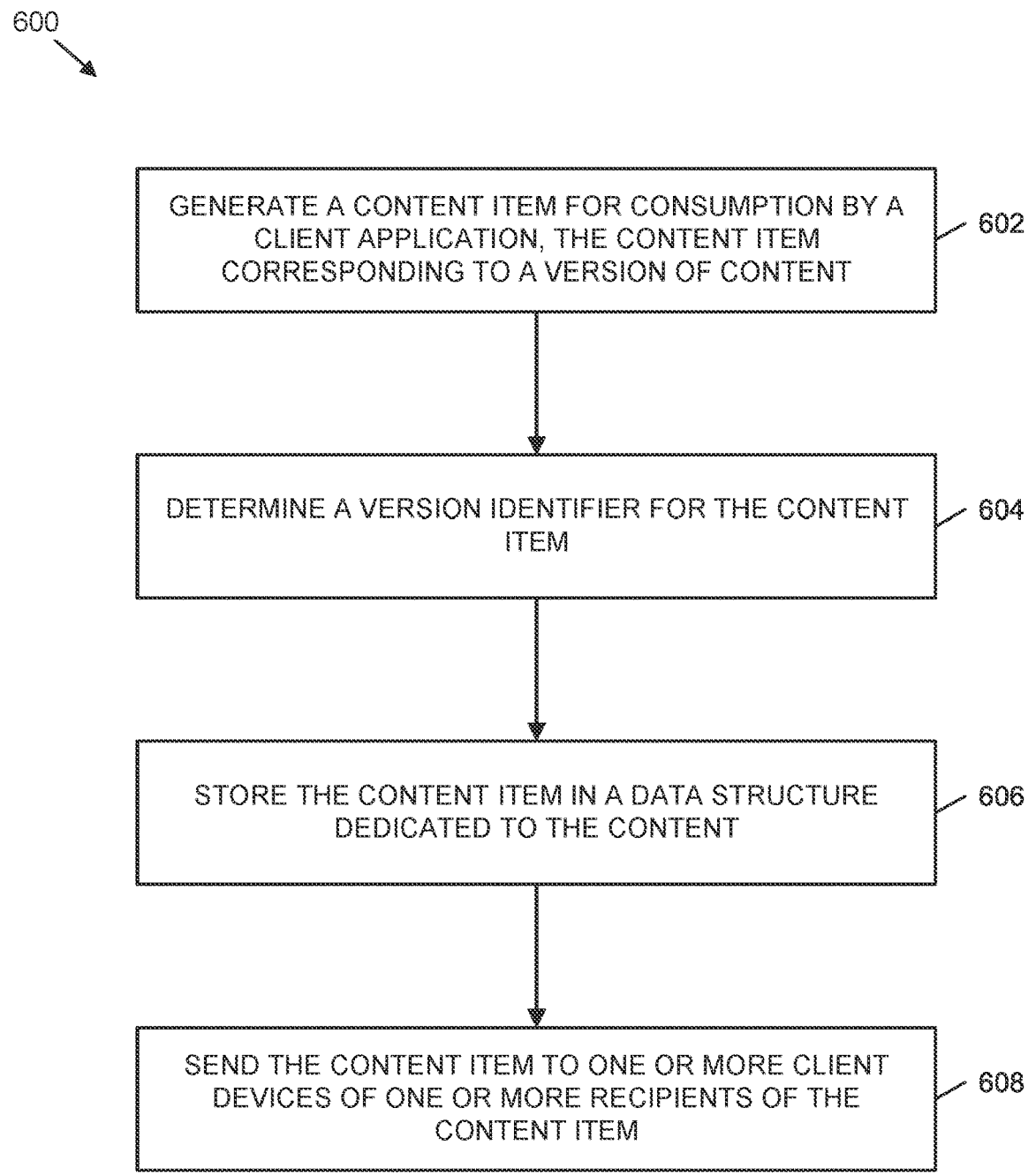
FIG. 6 is a flowchart illustrating example operations of a process to generate and store content that is consumed using a client application, according to one or more example implementations.

FIG. 6 is a flowchart illustrating example operations of a process 600 to generate and store content that is consumed using a client application, according to one or more example implementations. The process 600 may include, at operation 602, generating a content item for consumption by a client application. The content item may correspond to a version of content. Consumption of the content item by a client application may include the display of at least a portion of the content item in a user interface produced by the client application and/or the playback of audio corresponding to the content via one or more output devices. The content item may include at least one of text content, video content, image content, audio content, annotations, overlays, or creative works. In one or more implementations, the content item may be produced by an instance of a client application executed by a client device. For example, the client device may receive one or more inputs via one or more input devices from a user of the client application during an active session of the client application to generate the content item. In additional implementations, the client application may be provided and maintained by a service provider that provides one or more services to users. In one or more examples, the service provider may provide at least one of social networking services or messaging services to users. In various examples, the content item may be generated by a representative of the service provider. In these scenarios, the content item may not correspond to content that is exchanged between users of the client application, but may be content that is provided to one or more users of the client application by the service provider.

In one or more illustrative examples, the content item may include a message of a plurality of messages communicated between users of the client application as part of a communication session. In these situations, each message included in the communication may correspond to a different version of the content. In additional examples, the content item may include a version of an image that includes one or more annotations made by a user of the client application and shared with one or more additional users of the client application. In further examples, the content item may include a version of a creative work offered by the service provider that users of the client application may use as an annotation for image content and/or video content.

At operation 604, the process 600 may include determining a version identifier for the content item. The version identifier for the content item may be determined according to a scheme. The scheme may indicate that version identifiers for versions of content include whole numbers that monotonically increase for each subsequent version of the content. In additional implementations, the version identifier may include a timestamp related to the content item. In one or more implementations, the version identifier may be generated by an instance of a client application that is used to produce the content item. In additional implementations, one or more permissions may be associated with version identifiers. In these scenarios, the one or more permissions may restrict the modification of version identifiers to an entity, system, or one or more computing devices. In one or more illustrative examples, the one or more permissions may indicate that version identifiers may be generated by one or more computing devices of a service provider. In these situations, the one or more computing devices of the service provider may send version identifier update commands to instances of client applications to produce and/or update versions identifiers of content.

Additionally, the process 600 may include, at operation 606, storing the content item in a data structure dedicated to the content. For example, an instance of a client application that generates the content item may cause a data structure to be created in a data store and/or database on a client device that executes the instance of the client application. The data structure may include one or more first data elements to store content data that stores one or more versions of the content, such as the content item. The data structure may also include one or more second data elements that store one or more version identifiers corresponding to the respective versions of the content. In various examples, each version of the content stored by the one or more first data elements may be associated with a single version identifier that is stored by a second data element. Further, for each instance of content stored by the client device, the client application may cause the client device to generate a dedicated data structure, such as a database table. Thus, in situations where the client device stores an instance of first content and an instance of second content, the client application may cause a first data structure to be created to store one or more versions and one or more version identifiers of the first content and the client application may cause a second data structure to be created to store one or more versions and one or more version identifiers of the second content.

The process 600 may also include, at operation 608, sending the content item to one or more client devices of one or more recipients of the content item. In situations where the content item is generated by an instance of a client application, a user of the client application may designate the one or more recipients of the content item. In various examples, the one or more recipients may subscribe to content produced by the user of the client device that used the client application to create the content item. Additionally, in scenarios where the content item is produced and distributed by a service provider, the one or more recipients may include users of the client application that have requested to receive the content item from the service provider. For example, the one or more recipients may request an annotation from the service provider that may be used as an overlay for images corresponding to the one or more recipients. In further implementations, the one or more recipients may include one or more subscribers to content that is produced by the service provider.

Figure 7:
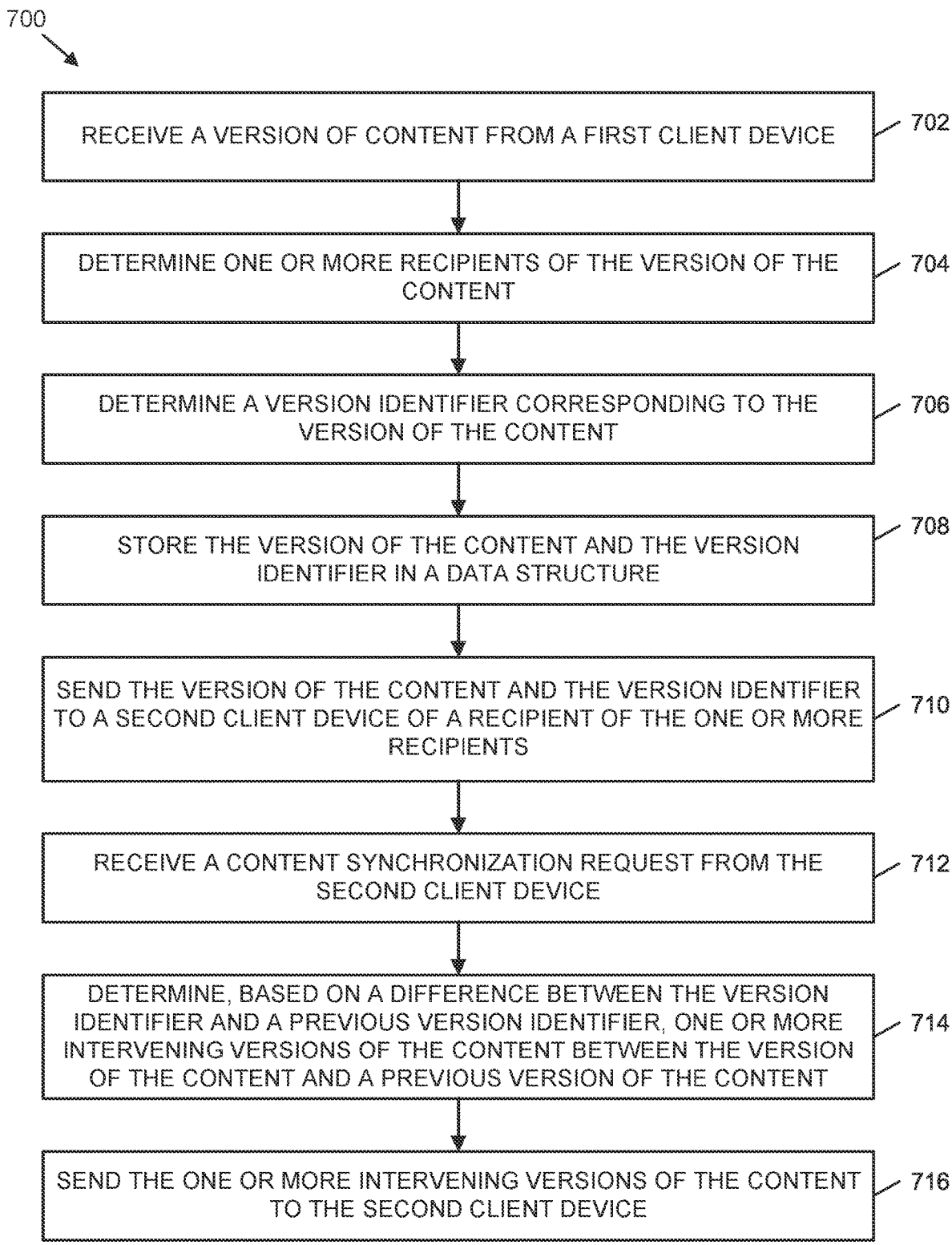
FIG. 7 is a flowchart illustrating example operations of content synchronization performed by a server system, according to one or more example implementations.

FIG. 7 is a flowchart illustrating example operations of a process 700 to synchronize content performed by a server system, according to one or more example implementations. The process 700 can include, at operation 702, receiving a version of content from a first client device. For example, a server system may receive a version of content that is generated by a user of the first client device using an instance of a client application executed by the first client device. In one or more illustrative examples, the version of the content may include a content item, such as a message. In additional illustrative examples, the version of the content may include an additional content item, such as an image or an image with one or more annotations.

At operation 704, the process 700 may include determining one or more recipients of the version of the content. At least a portion of the one or more recipients of the version of the content may be specified by a user of the first client device. In additional implementations, at least a portion of the one or more recipients of the version of the content may be determined based on a list of recipients stored by the server system of a service provider. In addition, the process 700 may include, at operation 706, determining a version identifier corresponding to the version of the content. In one or more implementations, the version identifier may be obtained from the first client device. In additional implementations, the version identifier may be generated by the server system. In various examples, the server system may analyze the version of the content to determine whether the version of the content satisfies one or more content-related and/or security-related criteria. In situations where the version of the content satisfies the one or more criteria, the server system may generate the version identifier. The version identifier may be generated according to one or more schemes. In illustrative examples, the version identifier may be generated such that for each version of the content, a numeral is assigned to the respective version of the content. As subsequent versions of the content are produced, the version identifier may monotonically increase. Thus, an initial version of the content may have a version identifier of "1" and a subsequent version of the content may have a version identifier of "2." In one or more additional example, the version identifier may include a timestamp that corresponds to a respective version of the content. In various examples, the server system may send the version identifier to the first client device. The server system may also send a version identifier update command to the first client device to cause the version identifier to be created, modified, and/or updated by the first client device.

Additionally, the process 700 may include, at operation 708, storing the version of the content and the version identifier in a data structure. The data structure may be dedicated to storing versions of the content and version identifiers corresponding to the respective versions of the content. In various implementations, the server system may produce respective data structures for each content item or collection of content items produced in relation to the client application. Additionally, the data structure may include a database table that includes one or more first data elements, such as one or more first columns and/or one or more first rows, to store content data that corresponds to one or more versions of the content. Further, the database table may include one or more second data elements, such as one or more second columns and/or one or more second rows, to store version data that corresponds to one or more version identifiers related to the content. Further, the process 700 may include, at operation 710, sending the version of the content and the version identifier to a second client device of a recipient of the one or more recipients of the content. In one or more implementations, the version of the content and the version identifier may be sent to the second client device as a push notification. To illustrate, the version of the content and the version identifier may be sent to the second client device without receiving a request from the second client device for the version of the content.

The process 700 may also include, at operation 712, receiving a content synchronization request from the second client device. In one or more implementations, the first client device, the second client device, and the server system may maintain separate data structures that are configured to store identical or nearly identical versions of the content. In various examples, the information stored by the data structures of the first client device, the second client device, and the server system may not be synchronized. That is, the information stored by the data structures of the first client device, the second client device, and the server system may not be the same or nearly the same. In these situations, content synchronization requests may be sent to the server system to synchronize the content stored by the respective data structures of the first client device, the second client device, and the server system. The content synchronization requests may indicate one or more versions of the content that are absent from a data structure of a client device. In one or more illustrative examples, the content synchronization requests may include a version identifier of a most recently obtained version of the content and a version identifier of a next most recently obtained version of the content.

At operation 714, the process 700 may include determining, based on a difference between the version identifier and a previous version identifier, one or more versions of the content between the version of the content and a previous version of the content. In various examples, the version of the content may be the most recent version of the content obtained by the second client device and the previous version of the content may correspond to the next most recent version of the content stored by the second client device. In one or more implementations, the version identifiers may include time stamps and the server system may determine an amount of time between a time stamp of the version of the content and a time stamp of the previous version of the content. In these situations, the server system may determine one or more versions of the content having time stamps that are between the time stamp of the version of the content and the time stamp of the previous version of the content. Additionally, version identifiers sent to the server system may indicate a gap in version identifiers according to the scheme by which the version identifiers are generated. To illustrate, for a scheme where the version identifiers correspond to numerals that monotonically increase for each version of the content in a series of versions, the identifier of the version of the content may be a first numeral, such as 10, and the version identifier of the previous version of the content may be a second numeral, such as 7. Continuing with this illustrative example, the server system may determine that a data structure of the second client device corresponding to the content may be missing two versions of the content related to version identifiers for the content corresponding to numerals 8 and 9. At operation 716, the process 700 may include sending the one or more intervening versions of the content to the second client device. One or more version identifiers corresponding to the one or more intervening versions of the content may also be sent to the second client device.

Figure 8:
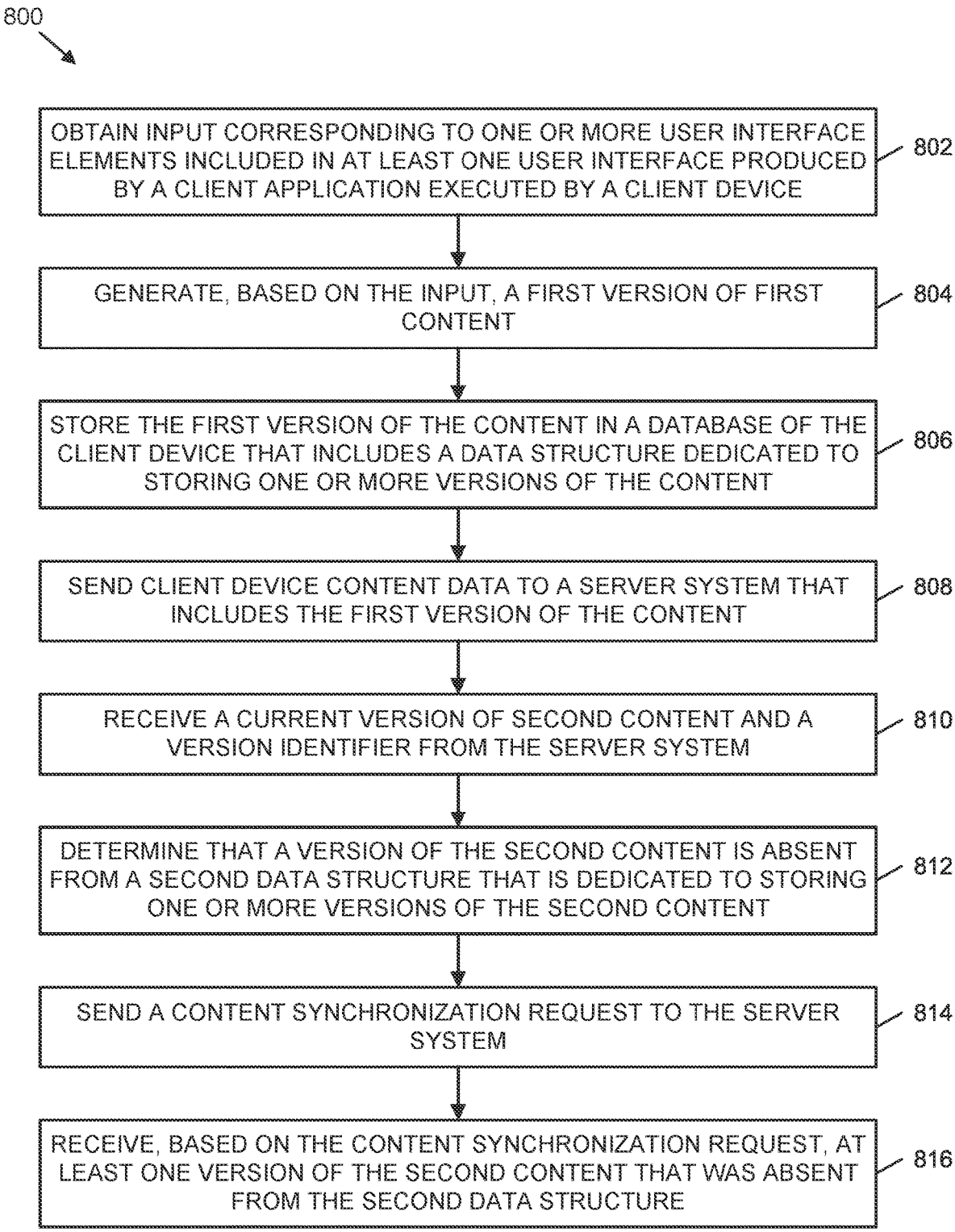
FIG. 8 is a flowchart illustrating example operations of content synchronization performed by a client device, according to one or more example implementations.

FIG. 8 is a flowchart illustrating example operations of a process 800 to synchronize content performed by a client device, according to one or more example implementations. At 802, the process 800 may include obtaining input corresponding to one or more user interface elements included in at least one user interface produced by a client application executed by a client device. In one or more implementations, the one or more user interface elements may include buttons, icons, text, images, or other features that may be selectable and/or activated via one or more input devices of a client device, such as a touchscreen, a microphone, and a camera of the client device. In addition, the process 800 may include, at operation 804, generating, based on the input, a first version of first content. For example, the input may be used by the client application to generate a message. The input may also be used by the client application to produce image content. The image content may include one or more overlays. In various examples, the first version of the content may correspond to an initial version of the content. In additional examples, the first version of the content may correspond to a version of the content that is produced after an initial version of the content. In one or more implementations, the initial version of the content may have been generated by the instance of the client application executed by the client device. Further, the initial version of the content may have been generated by a service provider or by another instance of the client application executed by a user of a different client device.

The process 800 may include, at operation 806, storing the first version of the content in a database of the client device. The database may include a data structure dedicated to storing one or more versions of the content. The data structure may include one or more first data elements that store first content data corresponding to one or more versions of the first content and one or more second data elements that store first version data corresponding to one or more version identifiers of the first content. At operation 808, the process 800 may include sending client device content data to a server system. The client device content data may include the first version of the content. In one or more examples, the client device content data may also indicate one or more recipients of the first version of the content.

Additionally, at operation 810, the process 800 may include receiving a current version of second content and a version identifier from the server system. The current version of the second content may be generated by another instance of a client application executed by an additional client device. In additional examples, the current version of the second content may be generated by a service provider. The second content may be different from the first content. For example, the first content may correspond to first messages exchanged in a first communication session between a first number of users and the second content may correspond to second messages exchanged in a second communication session between a second number of users. In additional examples, the first content may include messages of a communication session between a user of the client device and one or additional users and the second content may correspond to content generated by the server system, such as annotation content.

At operation 812, the process 800 may include determining that a version of the second content is absent from a second data structure that is dedicated to storing one or more versions of the second content. The second data structure can be different from the first data structure. For example, the first data structure may include a first database table and the second data structure can include a second database table. The client device may determine that one or more versions of the content are absent based on a lack of conformance with a version identifier scheme between the version identifier of the current version of the second content and an additional version identifier of a previous version of the second content. To illustrate, one or more version identifiers of additional versions of the second content may be absent from the data structure.

The process 800 may then include, at 814, sending a content synchronization request to the server system. In additional implementations, the content synchronization request may not be sent based on determining that content is missing from the second data structure. In these scenarios, content synchronization requests may be sent periodically. That is, the client application may send content synchronization requests after a period of time has elapsed instead of or in addition to sending content synchronization requests based on a determination that specific content is not stored by the client device. In one or more illustrative examples, the content synchronization request may include a time of a previous synchronization request or a timestamp corresponding to a previous version of the second content stored by the second data structure. At operation 816, the process 814 may include receiving, based on the content synchronization request, at least one version of the second content that was absent from the second data structure. To illustrate, the client device may receive one or more versions of the second content from the server system that have version identifiers that correspond to one or more missing version identifiers according to the scheme by which version identifiers of the second content are generated.

Figure 9:
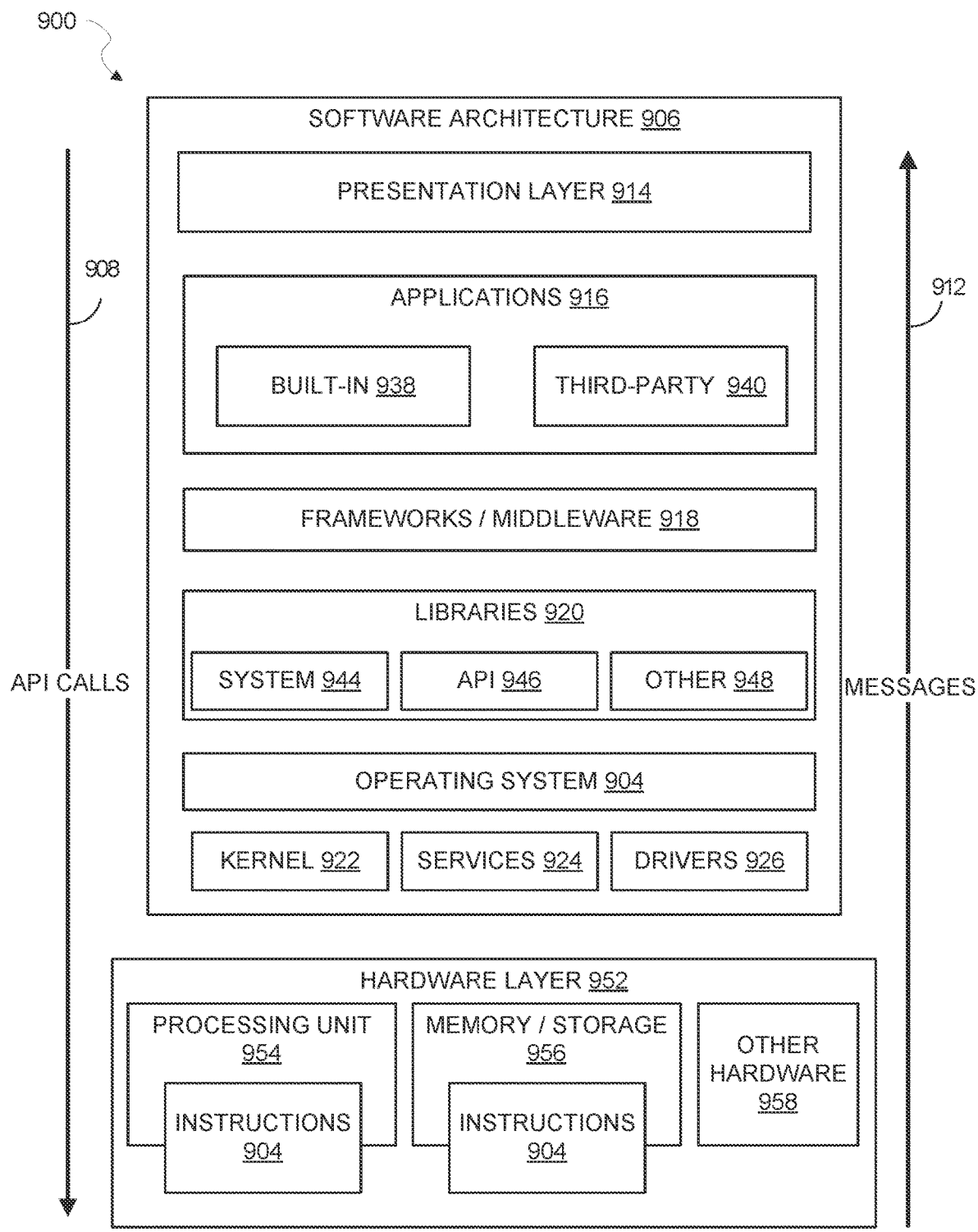
FIG. 9 is block diagram illustrating a representative software architecture that may be used in conjunction with one or more hardware architectures described herein, in accordance with one or more example implementations.

FIG. 9 is a block diagram illustrating system 900 that includes an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
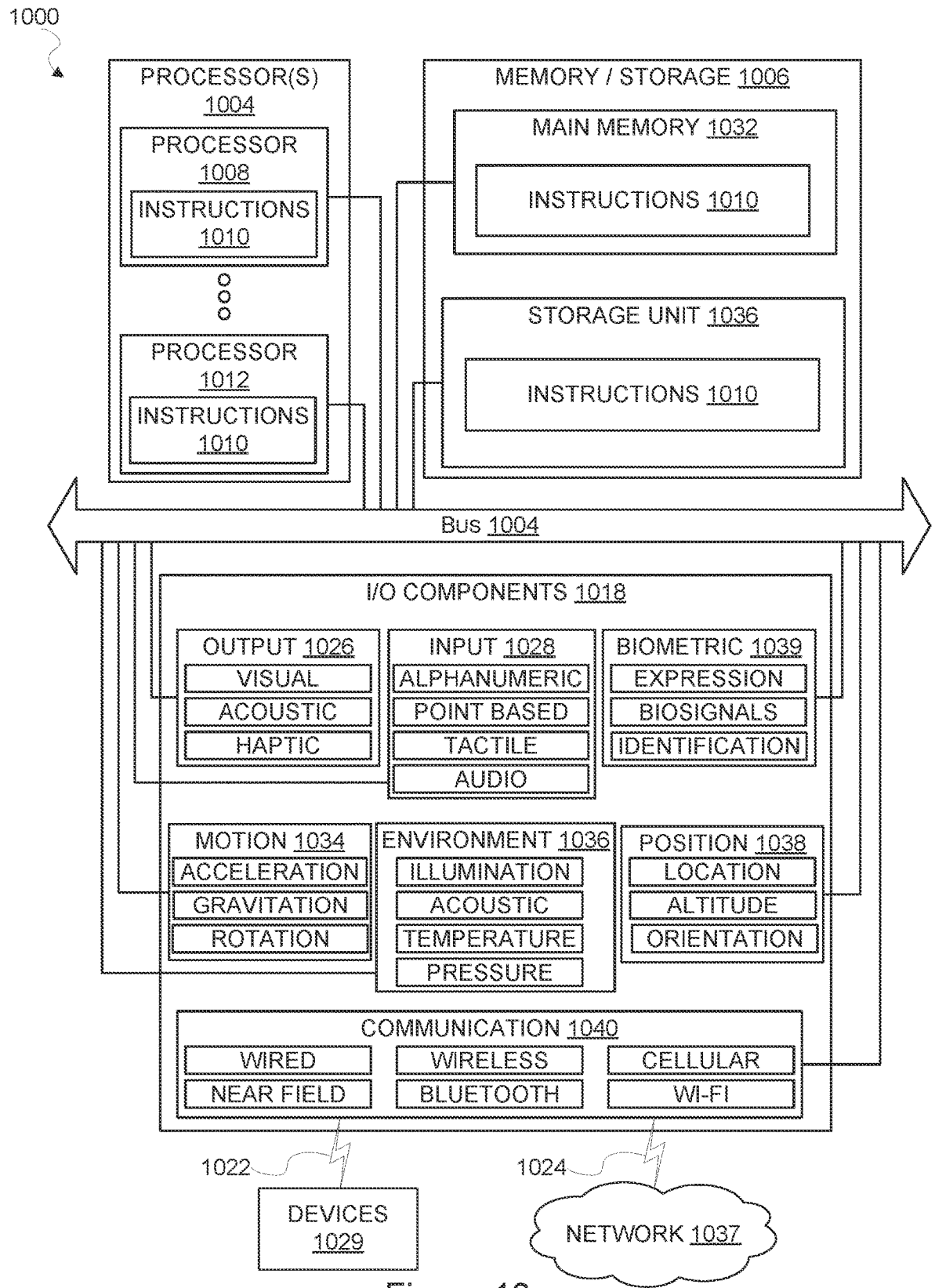
FIG. 10 is a block diagram illustrating components of a machine, in the form of a computer system, that may read and execute instructions from one or more machine-readable media to perform any one or more methodologies described herein, in accordance with one or more example implementations.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor 1008 with a single core, a single processor 1008 with multiple cores (e.g., a multi-core processor), multiple processors 1008, 1012 with a single core, multiple processors 1008, 1012 with multiple cores, or any combination thereof.

The memory/storage 1006 may include a memory 1014, such as a main memory 1032, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1029 may be another machine 1000 or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

Glossary

"CARRIER SIGNAL," in this context, refers to any intangible medium that is capable of storing, encoding, or carrying transitory or non-transitory instructions 1010 for execution by the machine 1000, and includes digital or analog communications signals or other intangible medium to facilitate communication of such instructions 1010. Instructions 1010 may be transmitted or received over the network 110 using a transitory or non-transitory transmission medium via a network interface device and using any one of a number of well-known transfer protocols.

"CLIENT DEVICE," in this context, refers to any machine 1000 that interfaces to a communications network 110 to obtain resources from one or more server systems or other client devices 102, 104. A client device 102 104 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110.

"COMMUNICATIONS NETWORK," in this context, refers to one or more portions of a network 110 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM," in this context, refers to a component, device, or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1008 or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1008 configured by software to become a special-purpose processor, the general-purpose processor 1008 may be configured as respectively different special-purpose processors (e.g., comprising different hardware components) at different times. Software accordingly configures a particular processor 1008 or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor 1008 or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 110 (e.g., the Internet) and via one or more appropriate interfaces (e.g., an API). The performance of certain of the operations may be distributed among the processors, not only residing within a single machine 1000, but deployed across a number of machines. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR," in this context, refers to any circuit or virtual circuit (a physical circuit emulated by logic executing on an actual processor 1008) that manipulates data values according to control signals (e.g., "commands," "op codes," "machine code," etc.) and which produces corresponding output signals that are applied to operate a machine 1000. A processor 1008 may, for example, be a CPU, a RISC processor, a CISC processor, a GPU, a DSP, an ASIC, a RFIC or any combination thereof. A processor 1008 may further be a multi-core processor having two or more independent processors 1004 (sometimes referred to as "cores") that may execute instructions 1010 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by one or more computing devices of a server system, a version of content from a first client device, the version of the content comprising a message in a communication session between a sender and one or more recipients and the communication session being established using messaging functionality of a client application;
determining, by the one or more computing devices, the one or more recipients of the version of the content;
determining, by the one or more computing devices, a version identifier corresponding to the version of the content;
storing, by the one or more computing devices, the version of the content and the version identifier in a data structure, the data structure having one or more first data elements that store content data corresponding to one or more versions of the content and one or more second data elements that store version data corresponding to one or more version identifiers of the one or more versions of the content, wherein the one or more second data elements are associated with one or more permissions that restrict access by the first client device and a second client device to the version data stored by the one or more second data elements;
sending, by the one or more computing devices, the version of the content to the second client device of a recipient of the one or more recipients;
receiving, by the one or more computing devices, a content synchronization request from the second client device, the content synchronization request indicating a previous version identifier of a previous version of the content that precedes the version of the content, wherein the previous version of the content comprises an additional message in the communication session that precedes the message;
determining, by the one or more computing devices and based on a difference between the version identifier and the previous version identifier, one or more intervening versions of the content that are between the version of the content and the previous version of the content, wherein the one or more intervening versions of the content comprise one or more further messages of the communication session that are between the message and the additional message;
sending, by the one or more computing devices, the one or more intervening versions of the content to a second client device; and
sending, by the one or more computing devices, one or more version update commands to the second client device to update additional version data for the content.

2. The method of claim 1, wherein the version identifier is determined by the one or more computing devices according to a scheme indicating that version identifiers for versions of the content include whole numbers that monotonically increase for each subsequent version of the content generated after an initial version of the content.

3. The method of claim 1, wherein the version identifier includes a first timestamp indicating a first time and the previous version identifier includes a second timestamp indicating a second time that is before the first time.

4. The method of claim 1, wherein the version of the content is sent to the second client device as a push notification without receiving a request for the version of the content from the second client device.

5. The method of claim 1, wherein the additional version data corresponds to an instance of the content stored by an additional data structure included in a database of the second client device.

6. The method of claim 1, wherein the server system is used by a service provider to provide one or more services; and
the method comprises:
obtaining, by the one or more computing devices, an additional version of additional content from a client device of a representative of the service provider;
determining, by the one or more computing devices, an additional version identifier of the additional version of the additional content;
determining, by the one or more computing devices, one or more additional recipients of the additional content; and
sending, by the one or more computing devices, the additional version of the additional content and the additional version identifier to one or more client devices of the one or more additional recipients.

7. The method of claim 6, comprising storing, by the one or more computing devices, the additional version of the additional content and the additional version identifier in an additional data structure, the additional data structure having one or more first additional data elements that store additional content data corresponding to one or more additional versions of the additional content and one or more second additional data elements that store additional version data corresponding to one or more additional version identifiers of the additional content.

8. The method of claim 1, wherein:
the data structure is a first data structure;
the first client device includes a first database that is dedicated to the communication session and stores a second data structure having one or more first additional data elements that store first additional content data corresponding to the one or more versions of the content and one or more second additional data elements that store first additional version data corresponding to the one or more version identifiers of the content; and
the second client device includes a second database is dedicated to the communication session and that stores a third data structure having one or more third additional data elements that store second additional content data corresponding to the one or more versions of the content and one or more fourth additional data elements that store second additional version data corresponding to the one or more version identifiers of the content.

9. The method of claim 8, wherein:
the version of the content is produced by a first instance of a client application executed by the first client device; and
a second instance of the client application executed by the second client device generates a user interface that includes the version of the content.

10. A system comprising:
one or more hardware processors; and
one or more non-transitory computer-readable storage media including computer-readable instructions that, when executed by the one or more hardware processors, cause the one or more hardware processors to perform operations comprising:
receiving a version of content from a first client device, the version of the content comprising a message in a communication session between a sender and one or more recipients and the communication session being established using messaging functionality of a client application;

determining the one or more recipients of the version of the content;

determining a version identifier corresponding to the version of the content;

storing the version of the content and the version identifier in a data structure, the data structure having one or more first data elements that store content data corresponding to one or more versions of the content and one or more second data elements that store version data corresponding to one or more version identifiers of the one or more versions of the content, wherein the one or more second data elements are associated with one or more permissions that restrict access by the first client device and a second client device to the version data stored by the one or more second data elements;

sending the version of the content to the second client device of a recipient of the one or more recipients;

receiving a content synchronization request from the second client device, the content synchronization request indicating a previous version identifier of a previous version of the content that precedes the version of the content, wherein the previous version of the content comprises an additional message in the communication session that precedes the message;

determining, based on a difference between the version identifier and the previous version identifier, one or more intervening versions of the content that are between the version of the content and the previous version of the content, wherein the one or more intervening versions of the content comprise one or more further messages of the communication session that are between the message and the additional message;

sending the one or more intervening versions of the content to a second client device; and sending one or more version update commands to the second client device to update additional version data for the content.

11. The system of claim 10, wherein the data structure is dedicated to storing messages generated as part of the communication session and includes a database table having one or more first columns that store the content data corresponding to the one or more versions of the content and one or more second columns that store the version data indicating the one or more version identifiers corresponding to the one or more versions of the content.

12. The system of claim 11, wherein the one or more non-transitory computer-readable storage media include additional computer-readable instructions that, when executed by the one or more hardware processors, cause the one or more hardware processors to perform additional operations comprising:

performing a query with respect to the version data stored in the one or more second columns to determine the difference between the version identifier and the previous version identifier.

13. The system of claim 11, wherein:

the one or more second columns are associated with one or more permissions that restrict access by the first client device and the second client device to the version data stored by the one or more second columns; and the one or more non-transitory computer-readable storage media include additional computer-readable instructions that, when executed by the one or more hardware processors, cause the one or more hardware processors to perform additional operations comprising:

sending one or more version update commands to the second client device to update additional version data for an instance of the content stored by an additional data structure included in a database of the second client device.

14. The system of claim 10, wherein:

the difference between the version identifier and the previous version identifier indicates a period of time; and the one or more intervening versions of the content correspond to one or more timestamps that are included in the period of time.

15. The system of claim 10, wherein the one or more non-transitory computer-readable storage media include additional computer-readable instructions that, when executed by the one or more hardware processors, cause the one or more hardware processors to perform additional operations comprising:

sending additional content to the first client device, the additional content being generated by a service provider for consumption using a client application;

receiving, from the first client device, an additional content synchronization request indicating that at least one version of the additional content is absent from an additional data structure of the first client device, the additional data structure dedicated to storing the additional content;

determine one or more versions of the additional content that are absent from the additional data structure; and sending the one or more versions of the additional content to the first client device.

16. A method comprising:

obtaining, via one or more input devices of a client device, input corresponding to one or more user interface elements included in at least one user interface produced by a client application executed by the client device;

generating, based on the input and by the client application, a first version of first content;

storing, by the client device, the first version of the first content in a first data structure included in a database of the client device, the first data structure having one or more first data elements that store first content data corresponding to one or more first versions of the first content and one or more second data elements that store first version data corresponding to one or more first version identifiers of the first content, wherein the one or more second data elements are associated with one or more permissions that restrict access to the first version data stored by the one or more second data elements to an instance of the client application executed by the client device;

sending, by the client device, client device content data to a server system, the client device content data including the first version of the first content and data indicating one or more recipients of the first version of the first content;

receiving, by the client device and from the server system, a current version of second content and a version identifier of the current version of the second content, wherein the current version of the second content includes a message included in a communication session between a user of the client device and an additional user of an additional client device;

determining, by the client device, that a second version of second content is absent from a second data structure having one or more first additional data elements that store second content data corresponding to one or more second versions of the second content and one or more second additional data elements that store second version data corresponding to one or more second version identifiers of the second content, wherein the second version of the second content that is absent from the second data structure includes an additional message sent from the additional user of the additional client device to the user of the client device;

sending, by the client device, a content synchronization request to the server system, the content synchronization request indicating a previous version identifier of a previous version of the second content that precedes a current version of the second content and indicating the version identifier of the current version of the second content; and receiving, by the client device and based on the content synchronization request, an updated communication session that includes at least one version of the second content that is between the current version of the second content and the previous version of the second content.

17. The method of claim 16, comprising determining a difference between the version identifier of the current version of the second content and the previous version identifier of the second content; and wherein determining that the second version of the second content is absent from the second data structure is based on the difference in relation to a scheme by which version identifiers of content are generated.

18. The method of claim 16, wherein the one or more second data elements of the first data structure and the one or more second additional data elements of the second data structure are associated with one or more permission that restrict modification of the one or more second data elements and the one or more second additional data elements to modifications made by the server system; and wherein the method comprises:

receiving, from the server system and in response to sending the client device content data to the server system, a version identifier update command; and modifying, based on the version identifier update command, a version identifier of the first content stored by a second data element of the one or more second data elements.

19. The method of claim 16, wherein:

the communication session is established using messaging functionality of the client application;

the content synchronization request is sent when the client application is closed; and the method comprises displaying a plurality of messages included in the updated communication session by one or more user interfaces of the client application in response to opening the client application.

20. The method of claim 16, wherein the client device receives the current version of the second content from the server system as part of one or more background processes during a period of time when the client application is not causing information to be displayed in association with the client application.

* * * * *